United States Patent [19]
Smith et al.

[11] Patent Number: 6,016,652
[45] Date of Patent: Jan. 25, 2000

[54] HYBRID ROCKET SYSTEM WITH DISPOSABLE CARTRIDGE

[75] Inventors: Kevin W. Smith, Coral Gables, Fla.; Korey R. Kline, San Fernando, Calif.; Theodore C. Slack, Jr., Miami, Fla.

[73] Assignee: Hy-Pat Corporation, Miami, Fla.

[21] Appl. No.: 08/834,212

[22] Filed: Apr. 15, 1997

Related U.S. Application Data

[63] Continuation-in-part of application No. 08/383,522, Feb. 3, 1995, Pat. No. 5,715,675, which is a continuation-in-part of application No. 08/327,673, Oct. 21, 1994, abandoned.

[51] Int. Cl.⁷ .................................................. F02K 9/72
[52] U.S. Cl. ................................................ 60/251; 60/253
[58] Field of Search ............................ 60/251, 253, 254, 60/255, 257

[56] References Cited

U.S. PATENT DOCUMENTS

| | | | |
|---|---|---|---|
| 2,791,883 | 5/1957 | Moore et al. | 60/251 |
| 3,082,666 | 3/1963 | Fitzpatrick . | |
| 3,125,955 | 3/1964 | Estes | 60/253 |
| 3,164,093 | 1/1965 | Holzman . | |
| 3,217,489 | 11/1965 | Thurston . | |
| 3,252,281 | 5/1966 | Everett . | |
| 3,334,489 | 8/1967 | Vilet . | |
| 3,443,475 | 5/1969 | Berton . | |
| 4,631,916 | 12/1986 | Tanter et al. | 60/251 |
| 5,010,730 | 4/1991 | Knuth et al. . | |
| 5,099,645 | 3/1992 | Schuler et al. . | |
| 5,101,623 | 4/1992 | Briley . | |
| 5,119,627 | 6/1992 | Bradford et al. . | |
| 5,579,636 | 12/1996 | Rosenfield | 60/251 |

FOREIGN PATENT DOCUMENTS 728880  3/1966  Canada .

*Primary Examiner*—Louis J. Casaregola
*Attorney, Agent, or Firm*—David P. Gordon; David S. Jacobson; Thomas A. Gallagher

[57] ABSTRACT

A solid/fluid hybrid propulsion system for a projectile launchable from a launch platform includes a container having a fluid reactant therein, an outer casing, and a cartridge. The cartridge is constructed and arranged to be moved between an operative position in which at least a substantial portion of the cartridge is received within the outer casing and an inoperative position in which the cartridge is dissociated from the outer casing. The cartridge includes at least a combustion chamber containing a solid reactant therein, a thrust nozzle proximal to one end of the combustion chamber, an oxidizer distribution plate proximal to the opposite end of the combustion chamber and having an injection nozzle therethrough, and a protective liner extending along at least the length of the combustion chamber and being interposed between the exterior surface of the solid reactant and the interior surface of the outer casing when the cartridge is in the operative position. A fluid-flow pathway connects the fluid reactant container and the combustion chamber.

17 Claims, 16 Drawing Sheets

HYBRID ROCKET SYSTEM WITH DISPOSABLE CARTRIDGE

RELATED APPLICATION

This application is a continuation in part of U.S. patent application Ser. No. 08/383,522 filed Feb. 3, 1995 U.S. Pat. No. 5,715,675 by the present inventors and entitled "Hybrid Rocket System and Integrated Motor for Use Therein", which is a continuation in part of U.S. patent application Ser. No. 08/327,673 filed Oct. 21, 1994, now abandoned.

BACKGROUND OF THE INVENTION

1. Field of the Invention

The present invention relates to hybrid (e.g., solid-liquid) propulsion systems for rockets and the like, and more particularly to a disposable cartridge suitable for application in such propulsion systems.

2. Description of the Related Art

Rocket motors generally fall into two classes: solid propellant motors in which a solid fuel element undergoes combustion to produce thrust that propels the rocket, and liquid propellant motors that accomplish the same function with a liquid fuel material. A hybrid rocket motor may be characterized as a cross between a solid propellant motor and a liquid propellant motor.

Generally, hybrid motors use a fluid oxidizer to burn a solid fuel element; however, they may use a combustible liquid fuel and a solid oxidizer. The hybrid rocket propellant can be ignited by an igniter, such as an electrically-generated spark, by pyrotechnic means, or by initial injection of an ignition fluid which exothermically reacts with the liquid oxidizer.

Some of the more well-known advantages of a hybrid rocket motor over a purely solid fuel motor are the complete separation of fuel from the principal oxidizer, thus eliminating the potential for inadvertent ignition or catastrophic failure; the ability to optimize the combination of propellant ingredients regardless of whether they are solid or liquid; and the ability to easily start, stop, and restart the motor, thereby making the motor easily throttleable since the solid fuel component need not contain any oxidizer. Because of these features, the motor is easily mass produced under less hazardous conditions and at a smaller cost.

A conventional hybrid rocket motor includes a hollow housing or combustion chamber in which an elongated solid fuel component, or "grain" is secured. The liquid or gaseous oxidizer is provided in a tank or container mounted forward of the fuel grain and flows along the fuel grain. Ignition causes combustion of the fuel oxidizer mixture at the exposed surface of the fuel grain, resulting in the generation of thrust as the high pressure combustion products are discharged through the rocket nozzle.

U.S. Pat. No. 5,099,645 to Schuler et al. discloses a hybrid rocket motor in which liquid oxidizer in a tank is passed through a heat exchanger to convert it to gaseous form and then used to oxidize a solid fuel grain. The gaseous oxidizer also is fed back to the tank to pressurize the remaining liquid oxidizer, and the solid grain burn is supplemented with additional liquid oxidizer. While this system provides acceptable results, it requires an unduly complicated, failure-prone delivery mechanism to ensure proper operation.

U.S. Pat. No. 5,010,730 to Knuth et al. discloses a hybrid rocket system which also converts the liquid oxidizer to gaseous form before presenting the oxidizer to the solid grain. In this system, the grain oxidizer combustion products are passed to a secondary combustion chamber where, like the Schuler et al. system, the combustion process is supplemented with additional liquid oxidizer. Somewhat alike in concept, these two systems suffer from similar disadvantages as noted above.

U.S. Pat. No. 5,101,623 to Briley discloses a hybrid rocket motor in which a hollow tube extends from combustion chamber holding the solid grain. At its nozzle end, the tube has a plurality of perforations.

The perforations permit liquid oxidizer to be injected into the combustion chamber and react with the fuel grain in a relatively constant and uniform pattern. This design, however, does not address the larger issues of motor design.

U.S. Pat. No. 5,119,627 to Bradford et al. discloses a hybrid system in which the solid fuel grain has a tank of non-flammable pressurized gas disposed therein. The pressurized gas is fed to the liquid oxidizer tank and is used to force the oxidizer into the combustion chamber. The Bradford et al. system is a rather specialized design which, due to its relative complexity, has limited flexibility in practical applications.

Thus, while the prior art designs implement a variety of workable systems, they all entail fairly complicated delivery systems. This results in limited flexibility, increased fabrication costs, and higher failure rates.

SUMMARY OF THE INVENTION

It is an object of this invention to provide a hybrid rocket motor that is safe to manufacture, transport, store, and utilize.

It is a further object of this invention to provide a hybrid rocket motor that is simple in structure and adaptable to a wide range of applications.

It is still a further object of the present invention to provide a hybrid rocket motor that is highly reliable in its operation.

It is another object of the present invention to provide a rocket motor assembly as a unitary structure in which the fuel grain and casing are formed as a unitary structure with the rocket motor.

It is yet another object of the present invention to provide a hybrid rocket motor with a shelf life longer than that of other rocket motor designs.

The above objects are achieved by providing a hybrid rocket motor having an oxidant tank communicating with a combustion chamber containing a solid fuel grain. The passage from the oxidant tank to the combustion chamber is obstructed by a fill tube which fills the oxidant tank with oxidant and pressurizes the oxidizer tank, as necessary. After the tank is full and as part of the launch sequence, the fill tube is displaced from the tank-chamber passage to deliver oxidant to the grain and initiate the combustion process. The motor may be an integral part of the rocket, or it may be a modular, expendable or exchangeable cartridge-type device inserted into a reusable body.

In the preferred form of the invention, the fuel grain/casing is injection molded as a hollow body of revolution about a longitudinal axis from a carbon-filled ABS (acrylonitrile butadiene styrene) plastic. A rocket motor nozzle is inserted in the mold at the aft end thereof and is integrally molded in place as part of the formation of the fuel grain/casing. A connection fitting threadedly connects the forward end of the molded fuel grain/casing with a pressurizable oxidant tank that is filled with nitrous oxide prior to launch. The connecting fitting includes an orifice tube designed to meter the flow of oxidant into the combustion chamber defined by the integrally molded fuel grain/casing. Excess oxidizer is vented to the ambient environment from the oxidizer tank by a vent tube that extends from the headspace at the forward end of the oxidizer tank and though a portion of the connection fitting. Prior to launch, a launch stem assembly substantially blocks or obstructs a fluid communication from the oxidizer tank to the combustion chamber. During the launch sequence, an ignition assist fluid or a pyrotechnic starter is used to initiate combustion with the subsequent relative movement between the launch vehicle and the launch stem assembly establishing fluid communication between the oxidizer tank and the combustion chamber. The integrated fuel grain/casing and motor are designed to remain structurally integral and shape-sustaining during the entire combustion period.

The preferred embodiment provides a hybrid rocket system and integrated motor in which the molded fuel grain/casing is fabricated from a commonly available and inexpensive plastic resin and in which the motor is molded within the fuel grain/casing at the time of manufacture thereof. The motor provides a mechanism by which a spent motor from a recovered launch vehicle can be rapidly and inexpensively replaced.

It is still another object of the present invention to provide a disposable cartridge-like insert that is receivable in a reusable body.

In accordance with the principals of the present invention, the foregoing object is achieved by providing a solid/fluid hybrid propulsion system for a projectile launchable from a launch platform. The propulsion system includes a container having a fluid reactant therein, an outer casing, and a cartridge. The cartridge is constructed and arranged to be moved, such as by a sliding motion, between an operative position in which at least a substantial portion of the cartridge is received within the outer casing and an inoperative position in which the cartridge is dissociated from the outer casing. The cartridge includes at least a combustion chamber containing a solid reactant therein, a thrust nozzle proximal to one end of the combustion chamber, an oxidizer distribution plate proximal to the opposite end of the combustion chamber and having an injection nozzle therethrough, and a protective liner extending along at least the length of the combustion chamber and being interposed between the exterior surface of the solid reactant and the interior surface of the outer casing when the cartridge is in the operative position. A fluid-flow pathway connects the fluid reactant container and the combustion chamber.

In accordance with this embodiment, the oxidizer distribution plate and/or the thrust nozzle can be hermetically sealed to the protective liner by, for example, an epoxy resin and/or the solid reactant. The protective liner can fabricated from, for example, flame-retardant cardboard and/or phenolic-bonded paper.

Other objects and further scope of applicability of the present invention will become apparent from the detailed description to follow, taken in conjunction with the accompanying drawings, in which like parts are designated by like reference characters.

BRIEF DESCRIPTION OF THE DRAWINGS

The accompanying drawings illustrate the present invention. In such drawings.

DESCRIPTION OF THE PREFERRED EMBODIMENT

Figure 1:
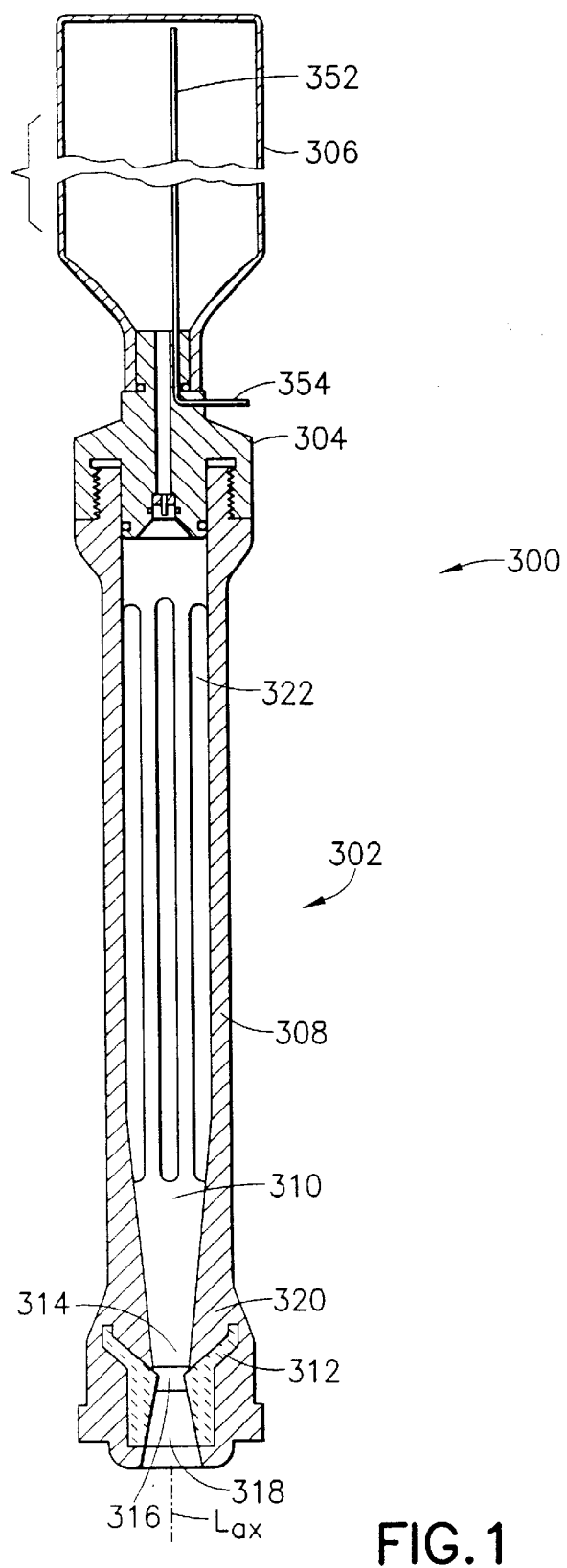
FIG. 1 is a cross-sectional view of a preferred embodiment of the present invention.

A preferred embodiment of a hybrid rocket system and motor in accordance with the present invention is shown in FIG. 1 and designated generally therein by the reference character 300. The system 300 is designed to be installed within a launch vehicle (not shown for reasons of clarity) and launched from a launch platform, the details of which are discussed below. The system 300 includes an integrated propulsion unit 302 connected at its upper, or forward, end to a connection fitting 304 that, in turn, is connected to the lower, or aft end, of an oxidizer tank 306 (partially illustrated). In the preferred embodiment, the oxidizer tank 306 is a DOT 1800 psi standard-sized aluminum pressure tank that includes internal ⅝×18 threads at its aft end. As explained below, the oxidizer tank 306 is filled with approximately 0.8 lbs of nitrous oxide which provides the oxygen for the principal portion of the burn sequence. A suitable oxidizer container is available from the Cliff Impact company of Eastlake, Ohio.

The propulsion unit 302 is formed as a hollow body of revolution about a longitudinal axis La and includes a fuel grain body 308 having a substantially cylindrical intermediate section and diametrically enlarged ends. The forward end of the propulsion unit 302 is provided with external 1¾—8 threads that are designed to engage complementary threads of the connection fitting 304. An interior, substantially cylindrical combustion chamber 310 is formed about the La and extends at least the length of the intermediate section of the propulsion unit 302. A thrust nozzle 312 is located within the fuel grain body 308 at the aft end of the propulsion unit 302 and includes a converging entry port 314 through which combustion products created in the combustion chamber 310 pass, a restricted cross-section throat 316, and a rearwardly diverging exhaust port 318.

The thrust nozzle 312 is of conventional geometry and is preferably molded or otherwise fabricated from a high temperature material such as graphite, phenolic, ceramic, or the like. Regardless of the material chosen for the thrust nozzle 312, the material must be substantially shape-sustaining for the duration of the flight.

The fuel grain body 308 is preferably formed from a carbon-filled ABS resin (available from General Electric under the T-4500 CYOLAC designation) that is molded by extrusion and/or injection into its final form. More particularly, the thrust nozzle 312 is placed over a core or mandrel that includes all of the features of the interior of the combustion chamber 310 (e.g., a two-piece mandrel or core that slides together axially from both sides of the thrust nozzle 312). The core and thrust nozzle 312 assembly is then inserted into the mold cavity and the carbon-filled ABS fuel grain material is introduced into the cavity to surround the mold core and the thrust nozzle 312. The geometry of the thrust nozzle 312 is such that the thrust nozzle 312 is bonded or otherwise securely embedded in place to form an integrated or unitary propulsion unit 302. If desired, the mold core can have a small angular taper (i.e., one half a degree or so) to assist in mold disassembly. As shown at the aft end of the fuel grain body 308, the ABS material is also designed to form a converging entry port shield 320 that covers or effectively shields the entry port 314 of the thrust nozzle 312. As explained below, the entry port shield 320 serves the same function as the entry port 314 and prevents ablation of the entry port 314 during the initial or early portion of the burn sequence. In addition, the interior surface that defines the combustion chamber 310 can include surface configurations that increase the burn-surface area provided for this purpose.

Figure 1A:
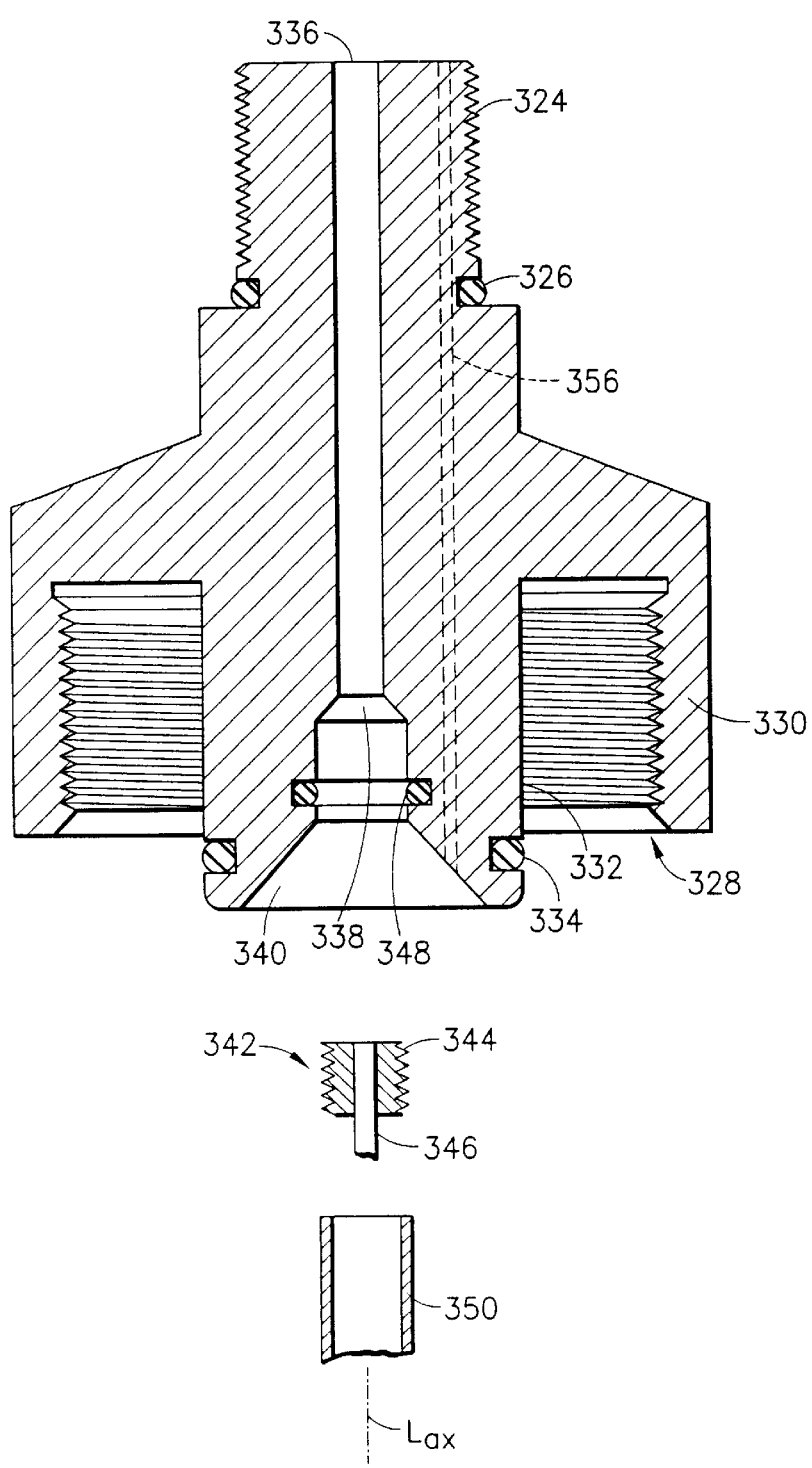
FIG. 1A is an enlarged detail, in cross-section, of a portion of FIG. 1.

The connection fitting 304, as shown in the detail of FIG. 1A, is formed as a machined component from a suitable material, such as aluminum, as a body of revolution about the longitudinal axis $L_{ax}$. At its upper end, the connection fitting 304 includes an externally threaded stub 324 that is designed to sealingly engage with the internal threads at the aft end of the oxidizer tank 306. An O-ring 326, mounted within a suitably formed groove (unnumbered); is located at the base of the stub 324 to assist in forming a fluid-tight seal with the oxidizer tank 306. The enlarged aft end of the connection fitting 304 is designed to interengage with the forward end of the propulsion unit 302 and, to this end, includes an annular channel 328 defined between a depending flange 330 and a reduced-diameter support surface 332 of the connection fitting 304. The flange 330 includes internal threads designed to engage with the external threads at the forward end of the propulsion unit 302. The diameter of the support surface 332 is selected to provide either a line-to-line fit or a slight clearance fit with the corresponding internal surface at the forward end of the propulsion unit 302. An O-ring 334, mounted in a suitable groove (unnumbered), provides a fluid-tight engagement with the propulsion unit 302. The use of a channel 328 to receive the forward end of the propulsion unit 302 provides a simple yet structurally enhanced interengagement between the connection fitting 304 and the propulsion unit 302. A coaxially located throughbore 336 extends between the forward and aft ends of the connection fitting 304. At the forward end, the throughbore 336 is of uniform diameter, and, at the aft end, the through bore 336 includes an enlarged-diameter internally threaded orifice seat 338 and a conically diverging oxidizer distribution port 340 serves to distribute the oxidizer into the combustion chamber 310 during launch and the subsequent burn sequence. In the preferred embodiment, the distribution port 340 is formed at an approximate 45 degree angle relative to the longitudinal axis $L_{ax}$.

An orifice 342 is mounted in threaded engagement with the internal threads of the orifice seat 338 and includes a threaded body 344 and an aft-directed orifice tube 346. The internal diameter of the orifice tube 346, which depends upon the particular flight requirements, is preferably in the 0.010 to 0.030 inch range and can be formed from 0.042 inch thick tubing typically used to manufacture hypodermic needles. The orifice 342 can be assembled as a brazement from a threaded body 344 that is brazed to the orifice tube 346. A fill tube O-ring 348 is mounted in a suitably formed groove (unnumbered) at the aft portion of the orifice seat 338 and is designed to provide a substantially fluid-tight seal with the upper end of a fill tube 350 (the upper end of which is shown in FIG. 1A).

In the preferred embodiment, the oxidizer tank 306 includes the facility to vent excess oxidizer from the headspace at the forward end of the oxidizer tank 306. As shown in FIG. 1, a vent tube 352 extends in the forward direction from the connection fitting 304 to a point adjacent to but spaced from the top of the oxidizer tank 306. A vent outlet tube 354 extends laterally from the side of the connection fitting 304. The vent tube 352 and the vent outlet tube 354 communicate through intersecting passages drilled into the connection fitting 304. The dimensions of the drilled passages are selected to provide a press fit with the vent tube 352 and the vent outlet tube 354. The vent tube 352 and the vent outlet tube 354 be fabricated from the same tubing stock used for the orifice tube 346. As an alternative to the configuration shown in FIG. 1 and as shown in FIG. 1A, a vent thru-passage 356 (dotted-line illustration) can be provided in the connection fitting 304 for receiving the aft end of the vent tube 352 so that excess oxidizer is vented into the combustion chamber 310.

The system 300 is assembled by threading the propulsion unit 302 into the aft end of the connection fitting 304 and threading the oxidizer tank 306 into the forward end of the connection fitting 304. The system 300 is mounted within or to a launch vehicle (not shown) and mounted upon a launch stem assembly that is described in its various forms more fully below. The launch stem assembly includes a fill tube 350, the upper end of which is shown in FIG. 1A and can include another tube (not shown in FIG. 1A) that introduces an ignition-assist gas into the combustion chamber 310. When the launch vehicle is mounted on the launch stem assembly, the upper end of the fill tube 350 is received within the enlarged diameter orifice seat 338 with the fill tube O-ring 348 engaging the outside diameter of the fill tube 350 to provide a fluid-tight seal. In the mounted configuration, the orifice tube 346 extends aftwardly into the top of the fill tube 350.

The oxidizer is loaded into the oxidizer tank 306 by pumping the oxidizer from its source through the fill tube 350 of the launch stem assembly, the throughbore 336 and into the oxidizer tank 306. As the level of oxidizer in the oxidizer tank 306 increases, ambient air and oxidizer in gaseous form in the headspace volume is vented through the venting passages described above. Oxidizer is continuously introduced into the oxidizer tank 306 until the oxidizer tank 306 is substantially full.

In order to effect a launch, combustion is initiated within the combustion chamber 310 by initially introducing a gaseous oxidizer or hydrocarbon/oxidizer combination into the combustion chamber 310. For example, the combustion chamber 310 is partially filled with gaseous oxygen at 50–125 psi through the below-described ignition assist tube. A spark igniter is then used to effect ignition with the interior walls of the fuel grain body 308. In the alternative, an electrically actuated pyrotechnic igniter that includes both fuel and oxidizer can be used. Enough oxidizer must be provided to reliably start the combustion and also provide enough initial thrust to cause the launch vehicle to rise on the launch stem assembly from the launch pad. At some point during this initial lift-off, the forward end of the fill tube 350 will disengage from the fill tube O-ring 348 and cause the oxidizer in the oxidizer tank 306 to discharge in a defined pattern from the oxidizer distribution port 340 into the combustion chamber 310. The flow from the oxidizer tank 306 then sustains combustion for the remaining portion of the burn sequence.

Where the oxidizer is vented through the connection fitting 304 into the combustion chamber 310 through the vent thru-passage 356 (dotted-line illustration in FIG. 1A), the use of an ignition-assist gas and the associated below-described ignition-assist tube can be eliminated since the vented oxidizer will provide sufficient oxygen for combustion using a simple spark or pyrotechnic igniter.

The commercially available carbon-filled ABS resin of the preferred embodiment functions as a dual-use material that provides both the shape-sustaining structure and the hydrocarbon fuel for a propulsion unit that is inexpensive to manufacture, inherently safe, has a long shelf life, and is reliable. The double butadiene bond in the resin provides a material having sufficient energy for use as a propellant. It is preferred that the material be infrared transmissive or reflective, i.e., not infrared absorbtive, since infrared-absorbent materials may allow sufficient heat to be absorbed into the material of the fuel grain body 308 during the burn sequence to cause premature structural failure. While the internal diameter of the combustion chamber 310 is progressively enlarged with continued burning during flight, the system 300 is designed so that the oxidizer is expended prior to the time when burn-through can occur or the structural integrity of the fuel grain body 308 can be compromised. In the preferred embodiment, the intermediate cylindrical portion of the fuel grain body 308 has a length of about 7.5 inches and has an outside diameter of about 1.480 inches with a wall thickness of about 0.250 inch to provide a combustion chamber 310 having an inside diameter of about 1.0 inch. For a fuel grain body 308 having this configuration, approximately 0.8 lbs of nitrous oxide is stored in the oxidizer tank 306 and, depending upon the flow rate through the orifice tube 346, a burn sequence of about 2 to 12 seconds can be expected. During this burn sequence, the wall thickness of the fuel grain body 308 in the area adjacent to the entry port 314 is reduced through combustion and or ablation to approximately 0.125 inch; this thickness being sufficient to maintain structural integrity. The above described entry port shield 320 functions to shield the entry port 314 during the initial portions of the burn sequence and eventually is consumed by combustion or ablation. Thereafter, the entry port 314 functions as a converging entry port. This design allows the use of a phenolic material for the thrust nozzle 312 and assures the structural integrity of the thrust nozzle 312 during the burn sequence.

The use of a trocar-type engagement between the launch stem assembly and the oxidizer tank 306 provides a simple and reliable way to fuel the system 300, and, additionally, retains the oxidizer in its oxidizer tank 306 until the launch vehicle has successfully effected a lift-off. If the pre-launch ignition using the ignition-assist gas is insufficient to effect a lift-off, the oxidizer will not be discharged from the oxidizer tank 306 into the combustion chamber 310. While the trocar type engagement is presently preferred, a burst diaphragm, as described below in relationship to FIG. 11 can be used. In the burst-diaphragm embodiment, the diaphragm blocks or obstructs any pre-launch oxidizer flow between the oxidizer tank 306 and the combustion chamber 310. The diaphragm is burst during the launch sequence by, for example, electrical heating to cause fracture, a pyrotechnic squib, or by physical rupture to cause a flow of the oxidizer between the oxidizer tank 306 and the combustion chamber 310. In addition to using a single-burst diaphragm, it is also possible to use a double-burst diaphragm in which the diaphragm is initially burst to a selected diameter to allow a first oxidizer flow rate through the diaphragm and burst a second time to a larger diameter to provide an increased oxidizer flow.

Figure 2:
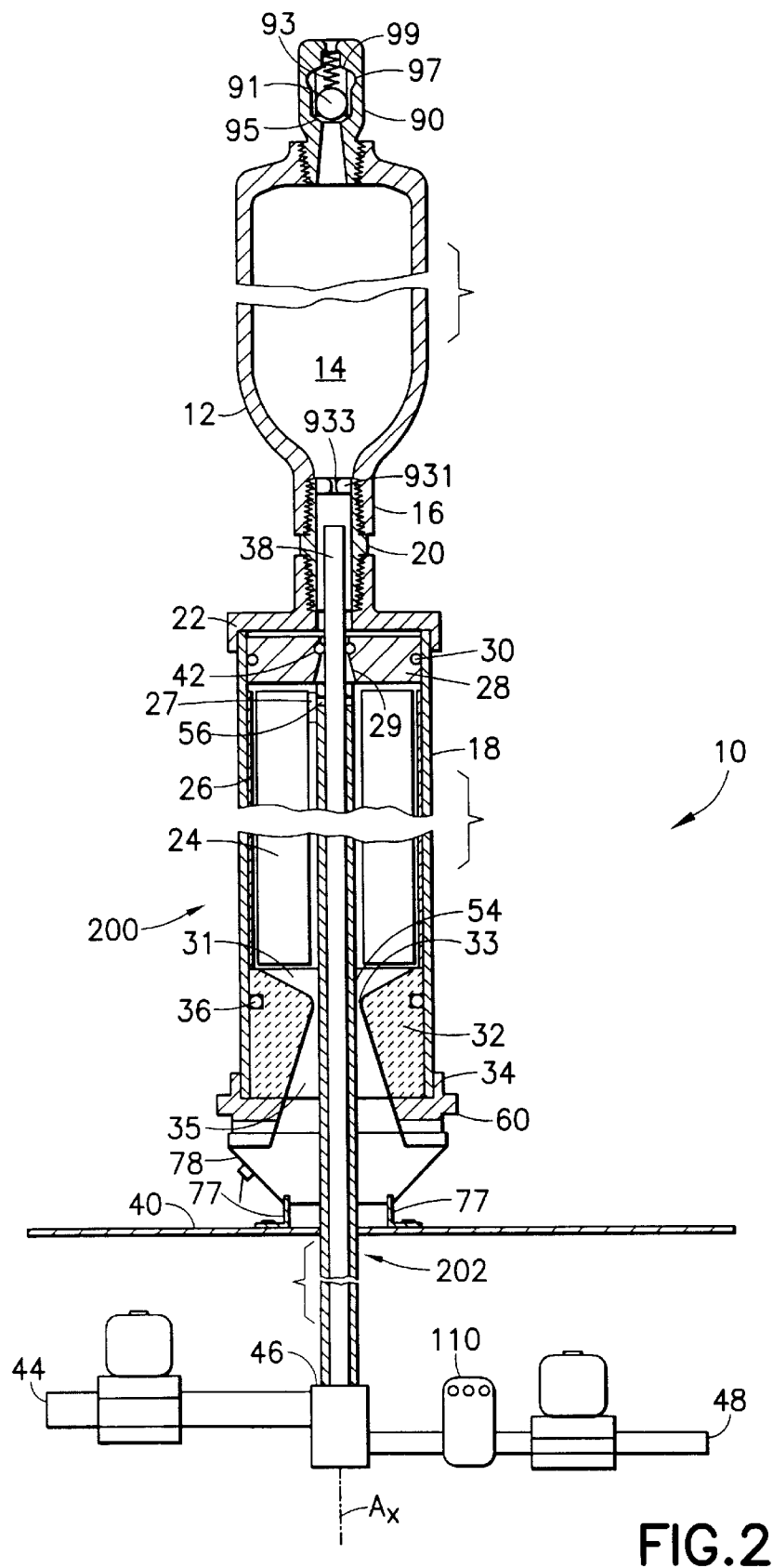
FIG. 2 is a cross-sectional view of a second embodiment of a rocket motor according to the present invention.

A second embodiment of the FIG. 2 and designated generally therein by the reference character 10 and is shown therein in its pre-launch position atop a launch platform 40. As shown, the system 10 is aligned along a longitudinal axis $A_x$ and includes a rocket motor assembly 200 at the aft or lower end and a reactant or oxidizer tank 12 located forwardly of the rocket motor assembly 200 along the longitudinal axis $A_x$. A vent valve 90 is located at the top or forward end of the oxidizer tank 12 for venting excess oxidizer during the pre-launch sequence. As explained more fully below, the oxidizer tank 12 is filled with an appropriate reactant or oxidizer 14 that is discharged from the oxidizer tank 12 into the rocket motor assembly 200 as part of the motor start and run sequence. The rocket motor assembly 200 is typically mounted in an air-frame structure and fuselage that has not been illustrated in the various figures for reasons of clarity.

The rocket motor assembly 200 is defined by a cylindrical outer casing 18 that is coaxially aligned relative the longitudinal axis $A_x$, an aft-end retainer 34, and a forward-end cap 22. The forward-end cap 22, the oxidizer distribution plate 28, the outer casing 18 and the aft-end retainer 34 are preferably made from a lightweight, strong material such as 606 1-T6 aluminum. In general, the aft-end retainer 34 and the forward-end cap 22 are in threaded engagement with their respective ends of the outer casing 18. The aft-end retainer 34 includes a radially extending flange 60 and may be engaged, as explained below, by releasable clamps (not shown in FIG. 2) that retain the system 10 on the launch platform 40 until the moment of lift-off. The forward end cap 22 includes an internally threaded, upwardly facing extension (unnumbered) that assists in coupling the oxidizer tank 12 to the rocket motor assembly 200 as explained below. The interior of the rocket motor assembly 200 includes a thrust nozzle 32 at the aft end, an oxidizer distribution plate 28 at the forward end, and a fuel grain 24 intermediate the thrust nozzle 32 and the oxidizer distribution plate 28.

The thrust nozzle 32 is of conventional design and is formed as a body of revolution about the longitudinal axis $A_x$. The thrust nozzle 32 includes a conically converging gas entry inlet 31, a reduced-diameter throat 33, and a conically diverging gas outlet 35. The thrust nozzle 32 may be retained in place within the outer casing 18 by an O-ring 36 that serves both to retain the thrust nozzle 32 in place and prevent undesired gas leakage between the outside diameter surface of the thrust nozzle 32 and the inside diameter surface of the outer casing 18. In the alternative, screw threads, adhesives, or cements may be used to secure the components together. The thrust nozzle 32 is preferably made from a high temperature material such as graphite, phenolic (less preferably), ceramic, or the like.

The oxidizer distribution plate 28, like the thrust nozzle 32, is formed as a body of revolution about the longitudinal axis $A_x$. The oxidizer distribution plate 28 includes a coaxially aligned oxidizer injection nozzle 29 that diverges in the aft direction. As explained more fully below, the oxidizer 14 in the oxidizer tank 12 is discharged in the aft direction through the oxidizer injection nozzle 29 toward and to the fuel grain 24. The oxidizer distribution plate 28 may be retained in place within the outer casing 18 by an O-ring 30 that serves both to retain the oxidizer distribution plate 28 in place and prevent undesired gas leakage between the outside diameter surface of the oxidizer distribution plate 28 and the inside diameter surface of the outer casing 18. In the alternative, screw threads, adhesives, or cements may be used to secure the components together. An O-ring 42 is mounted in an appropriate groove (not shown) adjacent the narrow, upper end of the oxidizer injection nozzle 29. As explained below, the O-ring 42 assists in preventing any oxidizer 14 from flowing from the oxidizer tank 12 into the rocket motor assembly 200 prior to launch.

The fuel grain 24 is formed as a cylindrical solid-fuel body that includes a central through-passage (unnumbered) that defines the principal portion of the combustion chamber (unnumbered). A sleeve-like protective liner 26 is interposed between the outside diameter surface of the fuel grain 24 and the inside diameter of the outer casing 18. The liner 26 functions to assist in retaining the fuel grain 24 in place and protecting the outer casing 18 from heat-damage as the fuel grain 24 burns. The liner 26 can be fabricated from 1/16" thick flame-retardant cardboard, phenolic bonded paper, or any non-flammable material that will protect the outer casing 18 from the burning fuel grain 24. As can be appreciated, the fuel grain 24 is effectively captured in the outer casing 18 between the oxidizer distribution plate 28 at the forward end of the rocket motor assembly 200 and the thrust nozzle 32 at the lower, aft end.

Referring to FIG. 2, an ignition pack 27 is mounted to the inside diameter surface of the fuel grain 24 at or near its forward end. The ignition pack is preferably a length of conductive electrical wire (i.e., copper) insulated with a plastic or other polymer material. The wire is bonded, adhered, or mechanically connected to the surface of the fuel grain 24 or may be received within an opening or cavity in the fuel grain 24. Upon application of a sufficient ignition voltage (e.g., 9000 volts), the wire will undergo energetic melting and form a hot, conductive plasma that releases sufficient heat to combust the polymer insulation and start the ignition burn.

The oxidizer tank 12 is mounted atop the rocket motor assembly 200 and is also aligned along the longitudinal axis $A_x$. The lower end of the oxidizer tank 12 includes a reduced-diameter neck 16 that is internally threaded and a transfer plate 931 having a central metering orifice 933 of pre-determined cross-section. As explained below, the transfer plate 931 is designed to meter the flow of oxidizer 14 from the oxidizer tank 12 into the rocket motor assembly 200 during operation. A connection fitting 20, having external threads at its opposite ends, is connected between the oxidizer tank 12 and the rocket motor assembly 200. The externally threaded ends of the connection fitting 20 are received in threaded engagement, respectively, with the internally threaded extension of the forward-end cap 22 and the internally threaded reduced-diameter neck 16 of the oxidizer tank 12. As shown in FIG. 2, a tapered pipe-thread is preferred, and, if desired, a suitable thread sealant (i.e., teflon) may be used to assure an adequately leak-proof engagement between the oxidizer tank 12 and the rocket motor assembly 200.

The vent valve 90 at the forward end of the oxidizer tank 12 includes a tapered externally threaded lower end that is in threaded engagement with an internally threaded opening in the oxidizer tank 12. Some type of vent or blow-off valve is required, when the fill tube 38 is used to fill the oxidizer tank 12 with a self-pressurizing oxidizer that undergoes a phase change upon pressurization; the vent valve ensures that the oxidizer tank 12 can be completely filled with the liquid phase. The vent valve 90 is designed to blow-off or vent gases in the oxidizer tank 12 during the fill process described below so that the oxidizer tank 12 can be completely filled. The vent valve 90 includes a valving ball 91 that is normally biased by a helical coil spring 93 against a lower valve seat 95. An enlarged diameter annular enlargement 97 is located above the valving ball 91 with the uppermost portion of the annular enlargement 97 defining a second valve seat 99.

The launch platform 40 includes a launch stem assembly 202 that extends upwardly from the surface of the launch platform 40 into the rocket motor assembly 200 and the connection fitting 20. As explained more fully below, the launch stem assembly 202 of FIG. 2 is designed to introduce oxidizer 14 into and fill the oxidizer tank 12 and also introduce an ignition-assist reactant or oxidizer into the combustion chamber. In FIG. 2, the launch stem assembly 202 is defined by two concentric tubes of differing axial length and diameter. In the preferred form, the launch stem assembly 202 includes an inner fill tube 38 that extends through the entire rocket motor assembly 200 and into the connection fitting 20. The O-ring 42 in the oxidizer injection nozzle 29 of the oxidizer distribution plate 28 seats against and engages the outside diameter surface of the fill tube 38 to effectively seal the rocket motor assembly 200 from the interior of the oxidizer tank 12. An outer ignition-assist tube 54 surrounds the fill tube 38 and terminates in the general vicinity of the oxidizer distribution plate 28 at the forward end of the fuel grain 24. The inside diameter of the ignition-assist tube 54 is larger than the outside diameter of the fill tube 38 to define an annular volume or space (unnumbered) therebetween. If desired and as shown in FIG. 2, a plurality of distribution holes 56 may be provided in the ignition-assist tube 54 immediately adjacent its upper end.

The fill tube 38 is fabricated from a material capable of withstanding high pressure. Preferably, the fill tube 38 is formed from a metal such as 304 stainless steel, a high thermal conductivity metal such as copper, or a high-strength polymer that can be used to fill the oxidizer tank with a self-pressurizing oxidizer such as gaseous oxygen (GOX), fluorine, nitrous oxide ($N_2O$) or carbon dioxide ($CO_2$). Alternatively, the oxidizer tank may be partially filled with a non-self-pressurizing oxidizer at low pressure, such as liquid oxygen (LOX), red fuming nitric acid (RFNA), or hydrogen peroxide ($H_2O_2$) and with a pressurant at high pressure, such as helium or nitrogen.

The launch stem assembly 202 extends downwardly through the reduced-diameter throat 33 of the thrust nozzle 32 and into the launch platform 40 where it connects to a fluid-distribution manifold 46. In general, the cross-section area of the launch stem assembly 202 should be such to effect a partial blocking of the throat 33 to partially obstruct gases escaping from the combustion chamber during ignition to build up pressure therein and ensuring ignition of the fuel grain 24 by the oxidizer 14. As shown on the lower left in FIG. 2, a gas entry port 44 is connected through an appropriate conduit and valving (unnumbered) to the manifold 46. Any ignition-assist oxidizer introduced into the gas entry port 44 will be directed by the manifold 46 into the annular space between the fill tube 38 and the ignition-assist tube 54 for delivery to and discharge at the upper end of the ignition-assist tube 54 in the vicinity of the oxidizer distribution plate 28 and the forward end of the fuel grain 24. In a similar manner, an oxidizer entry port 48 is positioned to the right of the manifold 46 and is also connected through an appropriate conduit and valving (unnumbered) to the manifold 46. Any oxidizer introduced into the oxidizer entry port 48 will be directed by the manifold 46 to the fill tube 38 for delivery and discharge at the upper end of the fill tube 38 into the connection fitting 20 and the connected oxidizer tank 12.

In its pre-launch configuration, the system 10 is tethered to the launch platform 40 by severable tie-down 78 connected between the aft-end retainer 34 and one or more anchor brackets 77 secured to the launch platform 40. The aft-end retainer 34 includes a diametrically aligned bore or opening (unnumbered) through which the tie-down 78 can be passed. The tie-down 78 is designed to hold the system 10 during ignition and release the system 10 only after the combustion products exhausted through the thrust nozzle 32 are sufficient to melt through and sever the tie-down 78. If desired, a portion of the tie-down 78 immediately beneath the thrust nozzle 32 can be of reduced cross-section to provide a predictable separation point. The tie-down 78 preferably is made of a material having a relatively low melting point, such as plastic, thin burn-through metal such as 304 S.S. foil, or a low melting point fusible alloy such as a bismuth alloy. A preferred and particularly inexpensive tie-down may be made from a nylon tie-wrap such as those used for bundling electrical cables and the like.

In order to effect a launch, a missile fabricated with the above described system 10 is mounted upon the launch stem assembly 202 and secured to the launch platform 40 by an appropriate tie-down 78. In its dormant, pre-launch state, the oxidizer tank 12 is empty. An appropriate quantity of oxidizer 14 is introduced into the oxidizer entry port 48 and conducted through the fill tube 38 into the connection fitting 20 where the oxidizer 14 begins filling the oxidizer tank 12 from its bottom through the metering orifice 933. During the fill procedure, the vent valve 90 functions to vent any gas in the headspace above the level of the oxidizer 14. Since the valving ball 91 is urged downwardly against its valve seat 95 by both gravity and the helical coil spring 93, the vent valve 90 functions as an overpressure blow-off valve for the gas in the headspace above the level of the oxidizer. Once the entire oxidizer tank 12 is filled with oxidizer 14, the oxidizer 14 will flow around the valving ball 91 with the drag force consequent to that upward flow lifting the valving ball 91 and forcing it upwardly against the upper valve seat 99. As can be appreciated, the vent valve 90 allows complete filling of the oxidizer tank 12.

Once the oxidizer tank 12 is completely filled and pressurized, the internal pressure of the oxidizer tank 12 will press against the forward face of the fill tube 38. Since the oxidizer 14 is at equilibrium, the fill tube 38 will effectively appear to be solid, and the force exerted by the oxidizer 14 on the fill tube 38 will be:

$$F = do2P/4 \tag{1}$$

where do is the outer diameter of the ill tube 38 and P is the pressure of the oxidizer 14 in the oxidizer tank 12. For example, a 0.250" fill tube inserted into a tank pressurized with 800 psi nitrous oxide ($N_2O$) will experience a force of:

$$F = (0.250)2(800)/4 = 39.2 \text{ lbs} \tag{2}$$

If this force is greater than the weight W of the entire rocket including the rocket motor assembly 200, the pressurized oxidizer 14 will tend to push the missile off of the fill tube 38.

Once the oxidizer tank 12 is filled with oxidizer 14, an ignition-assist gas, such as oxygen under pressure, is introduced into gas entry port 44 and is directed by the manifold 46 into the annular space between the fill tube 38 and the ignition-assist tube 54. The ignition-assist gas exits the ignition-assist tube 54 through the holes 56 and the upper end of the ignition-assist tube 54 to fill the combustion chamber and purge most or all of the ambient atmosphere therefrom. Once the combustion chamber has been filled with the ignition-assist gas, the system 10 is in its ready-to-launch state.

When the electrical ignition energy is provided to the ignition pack, the electrical wire will undergo energetic heating and, in the oxygen-rich atmosphere, will readily combust both itself and its polymer insulation. The heat from the resultant plasma will be sufficient to ignite the surface of the fuel grain 24 in the presence of the ignition-assist gas; burning will spread rapidly along the entire burn surface of the combustion chamber. As the heated combustion produces exhaust through the thrust nozzle 32, the tie-down 78 will heat, melt, and separate to release the missile from the anchor brackets 77. Once the tie-down 78 is severed, the downward force applied along the fill tube 38 will assist in lifting the missile from the launch platform assembly 202 until the O-ring 42 in the oxidizer distribution plate 28 moves above and clears the top of the fill tube 38. At this point, the oxidizer 14 will begin discharging from the oxidizer tank 12 through the metering orifice 933 and the oxidizer injection nozzle 29 into the combustion chamber. At this moment, the oxidizer 14 will dominate over the ignition-assist gas as the oxygen source for the combustion process.

It may be preferable to taper the end of the fill tube 38 above the O-ring 42 (as shown on the right in FIG. 2) so that the oxidizer 14 in the volume within the connection fitting 20 will be metered in a controlled manner through the oxidizer injection nozzle 29. In this way, an abrupt discharge of an oversupply of oxidizer 14 into the combustion chamber and any transient perturbations in the combustion process can be avoided.

If the oxidizer tank 12 is filled with oxidizer 14 using a mechanism other than the oxidizer manifold 46, the fill tube 38 may be replaced with a solid rod (not shown) so that the sealing function can be performed while reducing the weight and complexity of the system.

Figure 2A:
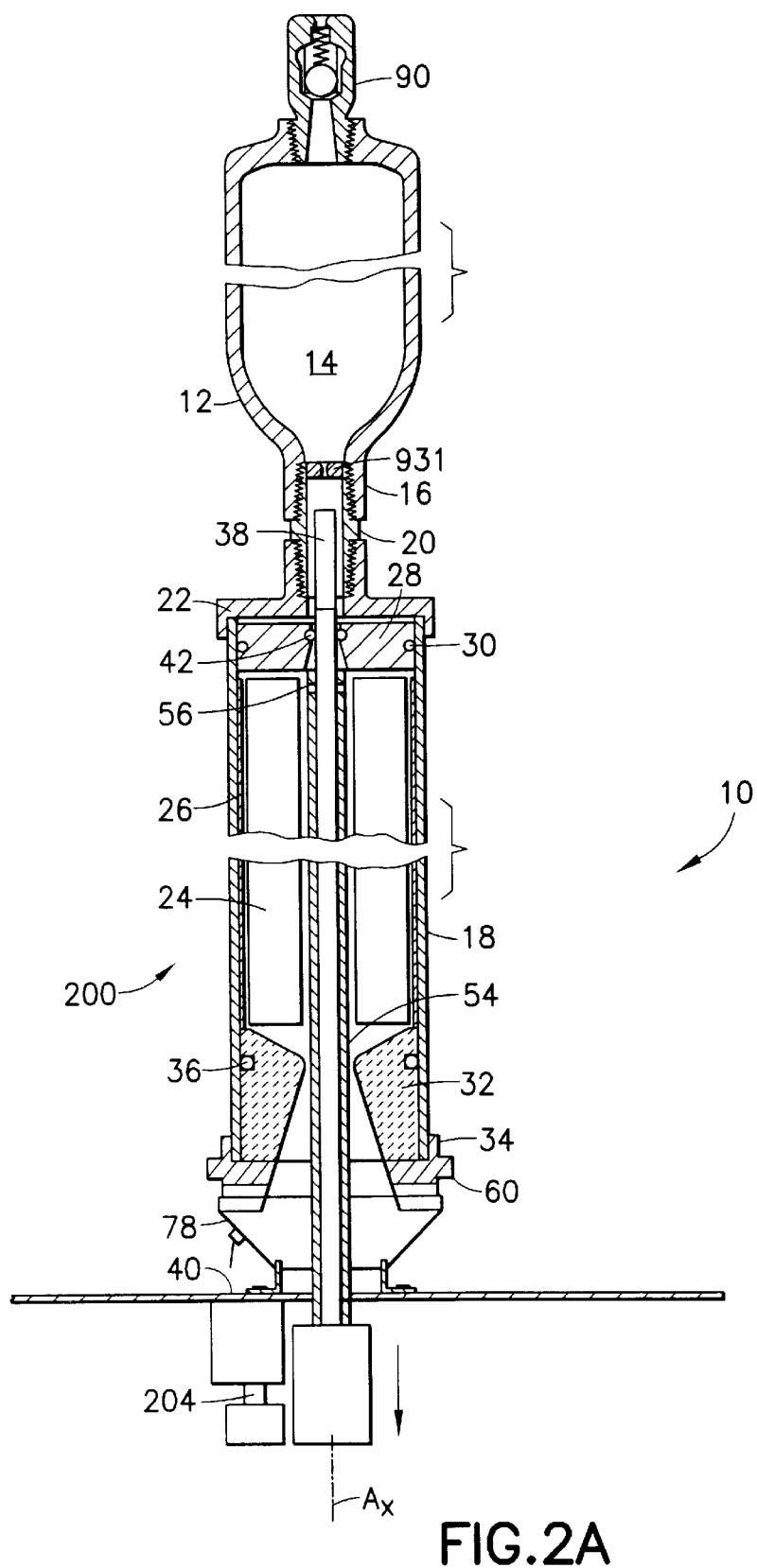
FIG. 2A is a cross-sectional view of a third embodiment of a rocket motor according to the present invention.

FIG. 2A illustrates a variant of the embodiment of FIG. 2 in which like elements are presented by like reference characters. In FIG. 2A, the launch stem assembly 202 is designed to be withdrawn downward into the launch platform 40 just after ignition. In FIG. 2, relative movement between fill tube 38 and its O-ring 42 was effected as the missile rises from the launch platform 40. In contrast, the organization of FIG. 2A effects relative movement between the fill tube 38 and its O-ring 42 by withdrawing the launch stem assembly 202 downward into the launch platform 40. The downward movement of the launch stem assembly 202 can be effected, for example, by an electrically driven leadscrew 204 or a pneumatic cylinder arrangement.

Figure 3:
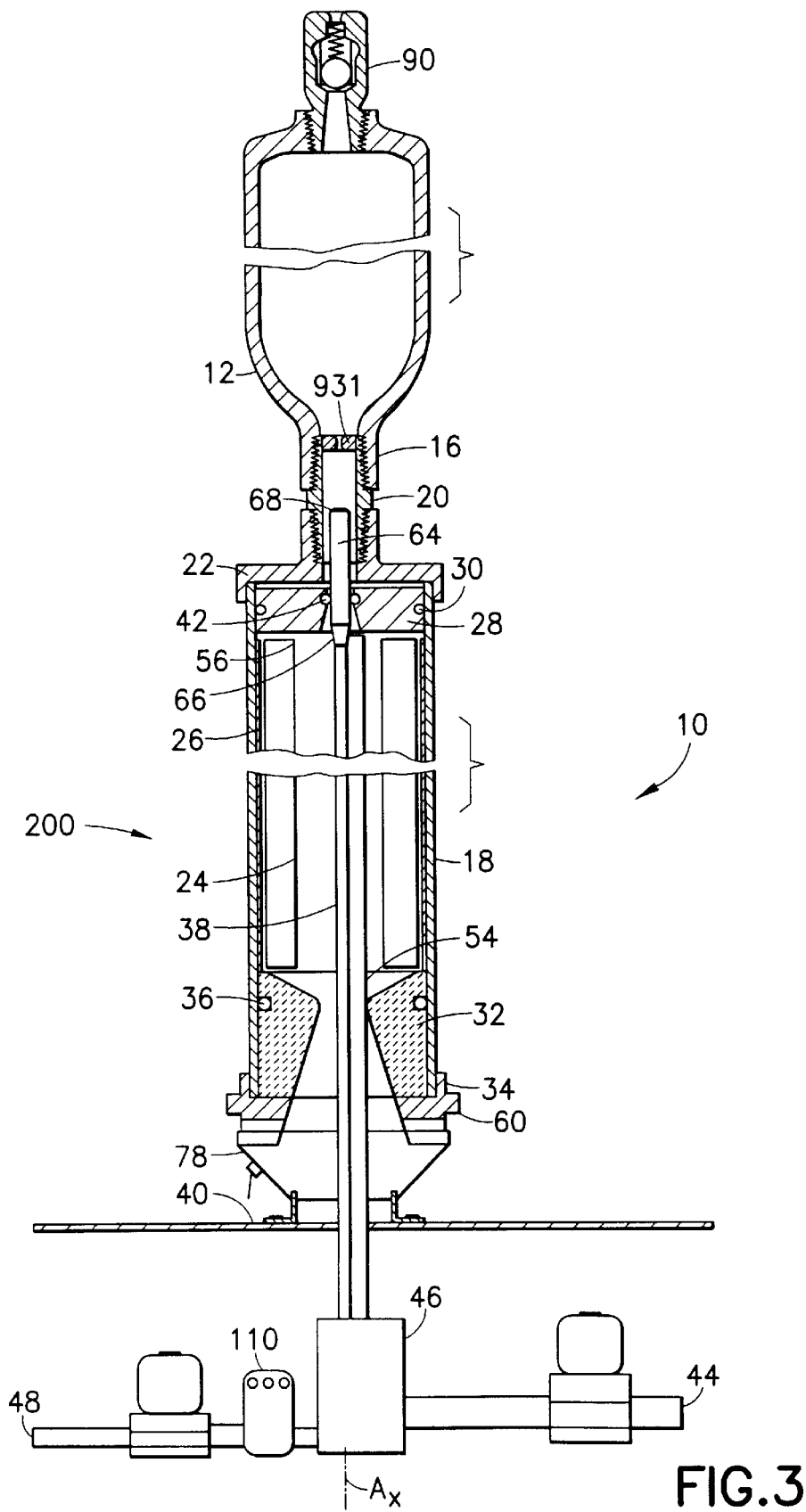
FIG. 3 is a cross-sectional view of a fourth embodiment of a rocket motor according to the present invention.

In the embodiment of FIGS. 2 and 2A, the ignition-assist gas is delivered through the annular space defined between the concentrically arranged fill tube 38 and its ignition-assist tube 54. In the embodiment of FIG. 3, the ignition-assist tube 54 is positioned in an adjacent side-by-side relationship with the fill tube 38. In order to provide for both the fill tube 38 and the ignition-assist tube 54 in the same interior volume, that portion of the fill tube 38 adjacent the ignition-assist tube 54 can be reduced in diameter as shown in FIG. 3.

Figure 4:
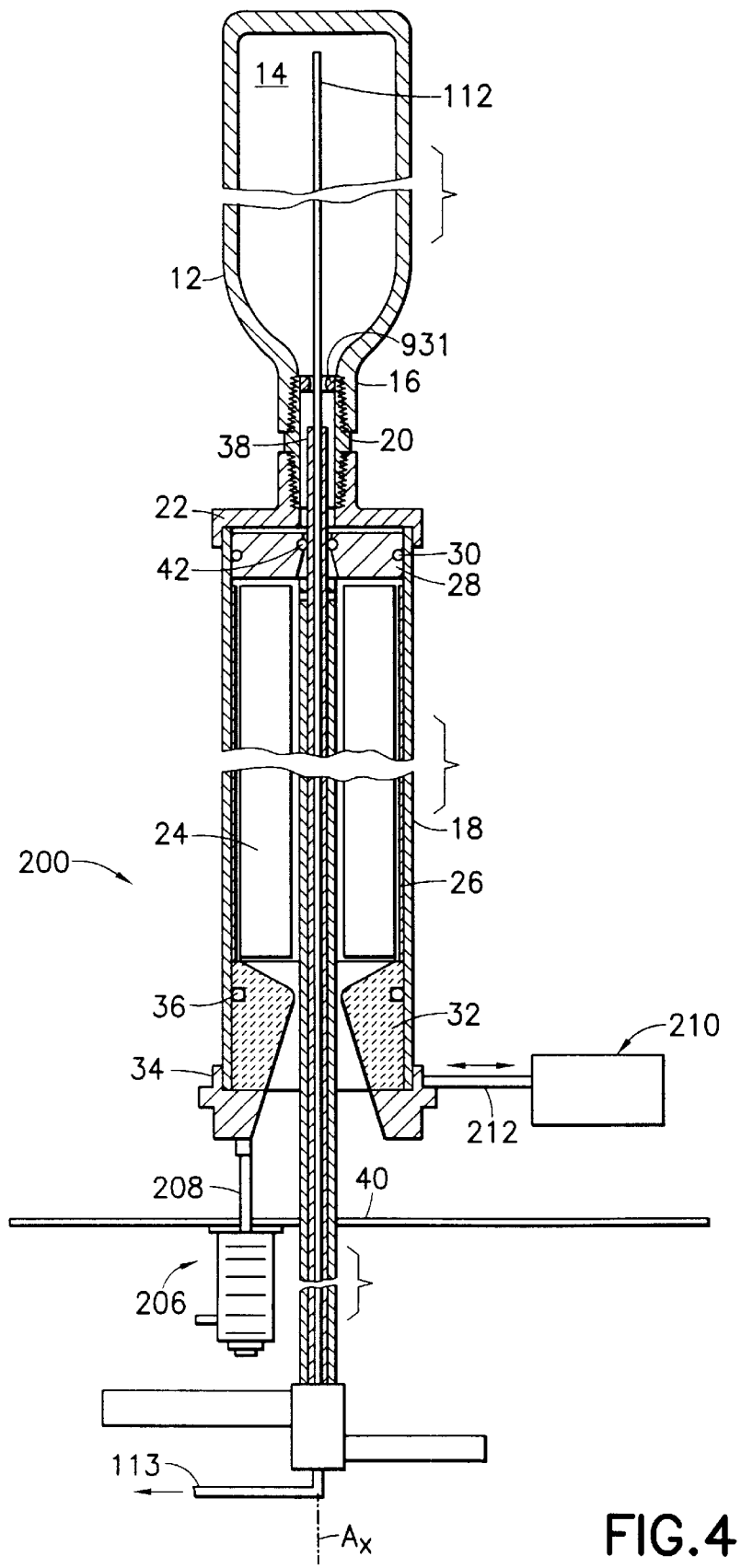
FIG. 4 is a cross-sectional view of a fifth embodiment of a rocket motor according to the present invention.

In the embodiments of FIGS. 1, 2, and 3, the vent valve 90 has been used to vent gas during the fill sequence in the headspace between the level of the oxidizer 14 as the oxidizer tank 12 is filled during the pre-launch sequence. While a vent valve 90 is suitable, a vent valve structure can be dispensed with as shown in FIG. 4. The launch stem assembly 202 in FIG. 4 is organized as three concentric tubes including an ignition-assist tube 54, a vent tube 112, and an intermediate fill tube 38. The ignition-assist tube 54 and the fill tube 38 serve the same functions as the corresponding elements in FIGS. 1–3. The vent tube 112, however, extends upwardly from the forward end of the fill tube 38, through the metering orifice 933 and terminates in a position spaced from but adjacent to the top of the oxidizer tank 12.

The pre-launch sequence for the embodiment of FIG. 4 is the same as that for the embodiments of FIGS. 2, 2A and 3. As the oxidizer 14 is introduced into the oxidizer tank 12 from the end of the fill tube 38, gas in the headspace above the level of the oxidizer 14 is vented from the oxidizer tank 12 through the vent tube 112 and is exhausted at vent tube exhaust 113.

The embodiment of FIG. 4 also differs from those of FIGS. 2, 2A and 3 in that a push-off actuator is used in substitution of the fusible tie-down 78. In FIG. 4, the push-off actuator 206 grips a portion of the aft-end retainer 34 to hold the missile to the launch platform 40 during the oxidizer fill process and during the first moments after ignition. Thereafter, the actuator arm 208 of the push-off actuator 206 pushes the missile upwardly along the launch stem assembly 202. The push-off force acts in conjunction with the downward force applied to the launch stem assembly 202 mentioned above to assist in launching the missile. In addition to or as an alternative to the push-off actuator 206, a retractable clamp actuator 210 can be use. As shown on the lower right of FIG. 4, the clamp actuator 210 includes an actuator bar 212 that is normally in engagement with the flange 60 and which is retracted after ignition to release the missile for lift-off.

Figure 5:
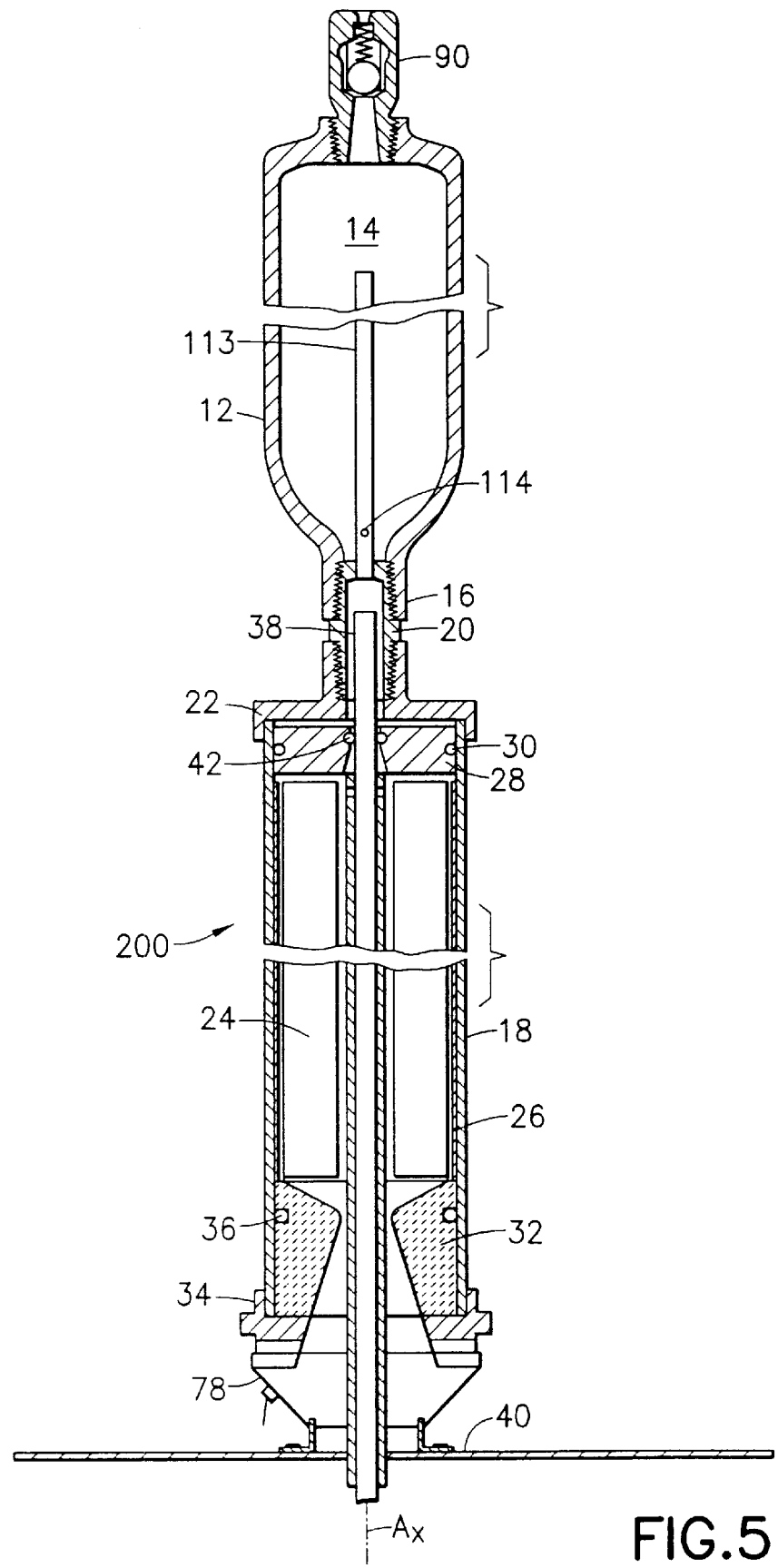
FIG. 5 is a cross-sectional view of a sixth embodiment of a rocket motor according to the present invention.

In the embodiments described above, the oxidizer 14 is metered through a metering orifice 933 and thereby introduced through the oxidizer injection nozzle 29 of the oxidizer distribution plate 28 into the combustion chamber. As shown in FIG. 5, the physical characteristics of the oxidizer 14 delivered to the rocket motor assembly 200 can be changed by an eduction tube 113. As shown, the eduction tube 113 extends upwardly from the metering orifice 933 and terminates in a region in the upper portion of the oxidizer tank 12. One or more small bleed openings 114 are provided in the wall of the eduction tube 113 immediately above and adjacent the metering orifice 33. In the first few moments of flight after the missile disengages from the launch stem assembly 202, oxidizer 14 in liquid form will be discharged from the lower end of the eduction tube 113 into connection fitting 20. With continued flight, the level of oxidizer 14 in the oxidizer tank 12 will drop to a level below the top of the eduction tube 113. Thereafter, oxidizer 14 in gaseous form will enter the top of the eduction tube 113 while oxidizer 14 in liquid form will enter the eduction tube 113 through the bleed openings 114. As a consequence, a combination of gaseous oxidizer 14 with entrained liquid oxidizer 14 will be delivered to the metering orifice 933 of the oxidizer distribution plate 28.

In the embodiments described above in relationship to FIGS. 1–5, a single oxidizer tank 12 supplies the oxidizer 14 to the combustion chamber. The embodiments of FIGS. 6 and 7 represent configurations suitable for use in which differing oxidant delivery rates are indicated, i.e., in those applications in which a 'boost' delivery rate is desired for some period of time at the beginning of the flight.

Figure 6:
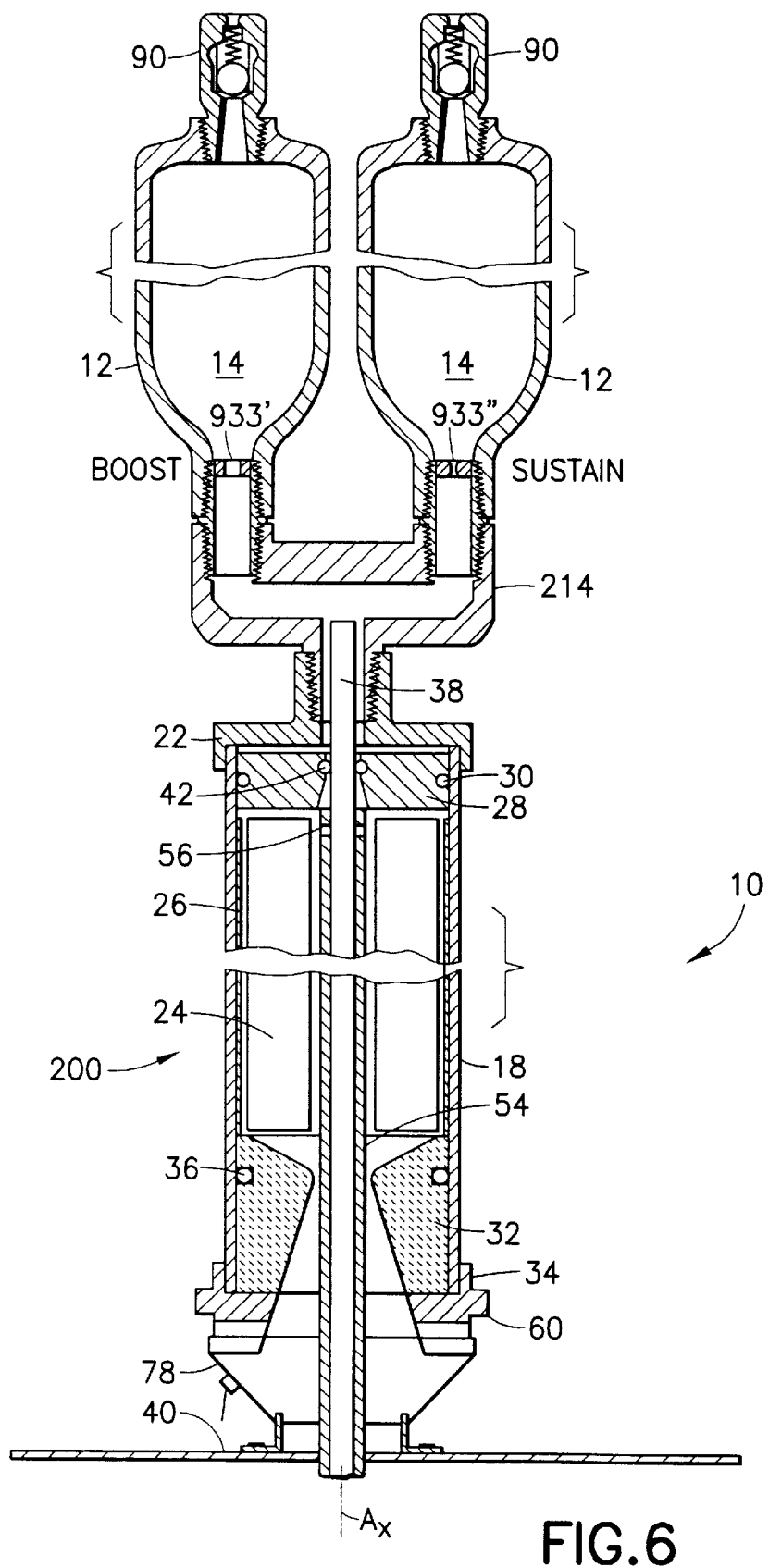
FIG. 6 is a cross-sectional view of a seventh embodiment of a rocket motor according to the present invention.

In FIG. 6, a left-side oxidizer tank 12 and a right-side oxidizer tank 12 are connected in a parallel-flow circuit by a manifold 214 that is in threaded engagement with the forward-end cap 22. The left-side oxidizer tank 12 includes a metering orifice 933' that is larger in diameter than the corresponding metering orifice 33" in the right-side oxidizer tank 12. The left-side oxidizer tank 12 is the "boost" oxidizer source while the right-side oxidizer tank 12 is the "sustain" oxidizer source. As can be appreciated, both oxidizer tanks will discharge their oxidizer into the rocket motor assembly 200 immediately after launch. However, the left-side oxidizer tank 12, with its larger metering orifice 933', will discharge its oxidizer contents at a faster rate than the right-side oxidizer tank 12. As a consequence, both oxidizer tanks will provide a "boost" quantity of oxidizer to the rocket motor assembly 200 during the initial portion of the flight. After the left-side oxidizer tank 12 is emptied (thereby ending the "boost" phase of the flight), the right-side oxidizer tank 12 will continue to provide oxidizer to sustain the remainder of the fuel-burn.

Figure 7:
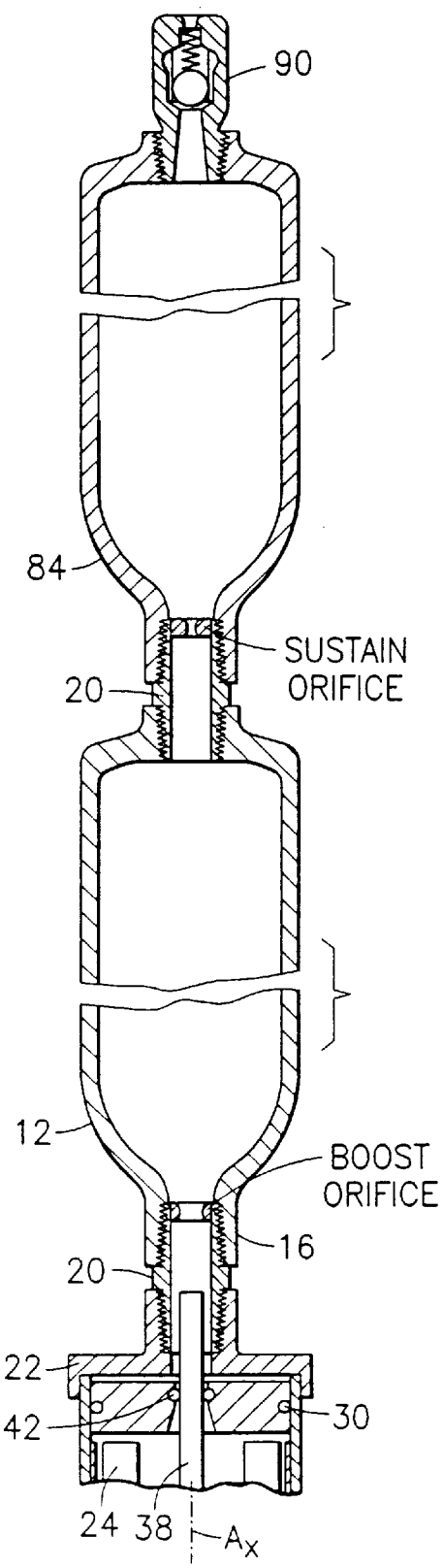
FIG. 7 is a cross-sectional view of a eighth embodiment of a rocket motor according to the present invention.

FIG. 7 presents a variant of the boost/sustain concept of FIG. 6. As shown, two oxidizer tanks are counted in a series flow-path with the upper oxidizer tank 12 having the smaller-diameter metering orifice 933' and the lower oxidizer tank 12 having the large-diameter metering orifice 933'. In this configuration, the upper oxidizer tank 12 represents the source of sustaining oxidant and the lower oxidizer tank 12 represents the source of the boost oxidant. As in the case of the embodiment of FIG. 6, both oxidizer tanks will discharge their oxidizer into the rocket motor assembly 200 immediately after separation from the launch stem assembly 202. However, the lower "boost" oxidizer tank 12, with its larger flow-through metering orifice 933', will discharge its oxidizer contents at a faster rate than the upper "sustain" oxidizer tank 12, As a consequence, both oxidizer tanks will provide a "boost" quantity of oxidizer to the rocket motor assembly 200 immediately after launch and during the initial portion of the flight. After the lower oxidizer tank 12 discharges the bulk of its contents (to thus end the "boost" phase of the flight), the upper oxidizer tank 12 will continue to provide oxidizer to sustain the remainder of the fuel-burn.

Figure 8:
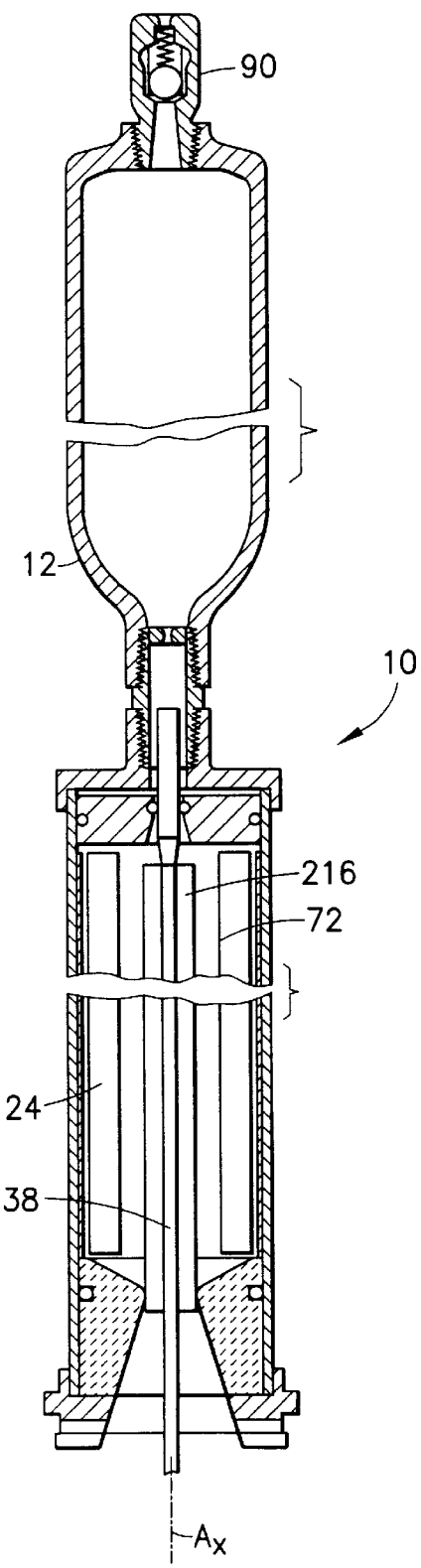
FIG. 8 is a cross-sectional view of an ninth embodiment of a rocket motor according to the present invention.

FIG. 8 illustrates an alternate ignition approach from that described above. In FIG. 8, a fill tube 38 of the type shown in FIG. 3 has been provided for filling the oxidizer tank 12 with oxidizer 14. However, the ignition-assist tube 54 has been dispensed with and replaced by a cylindrical ignition charge 216 formed about the reduced-diameter portion of the fill tube 38 and extending substantially from the forward. end of the fuel grain 24 to the reduced-diameter throat 33 of the thrust nozzle 32. The ignitior charge 216 includes an oversupply of an oxidizer component and also includes an ignition pack, for example, of the type described above. After the pre-launch filling of the oxidizer tank 12 is completed, an appropriate electrical charge is presented to the ignition pack to ignite the ignition charge 216 attached to the exterior of the fill tube 38. As the ignition charge 216 burns, the excess oxygen provided by the oversupply of the oxidizer component in the ignition charge 216 will sustain burning of the fuel grain 24 at least until the missile separates from the launch stem assembly 202 and the oxidizer 14 from the oxidizer tank 12 dominants as the oxidizer source.

Figure 9:
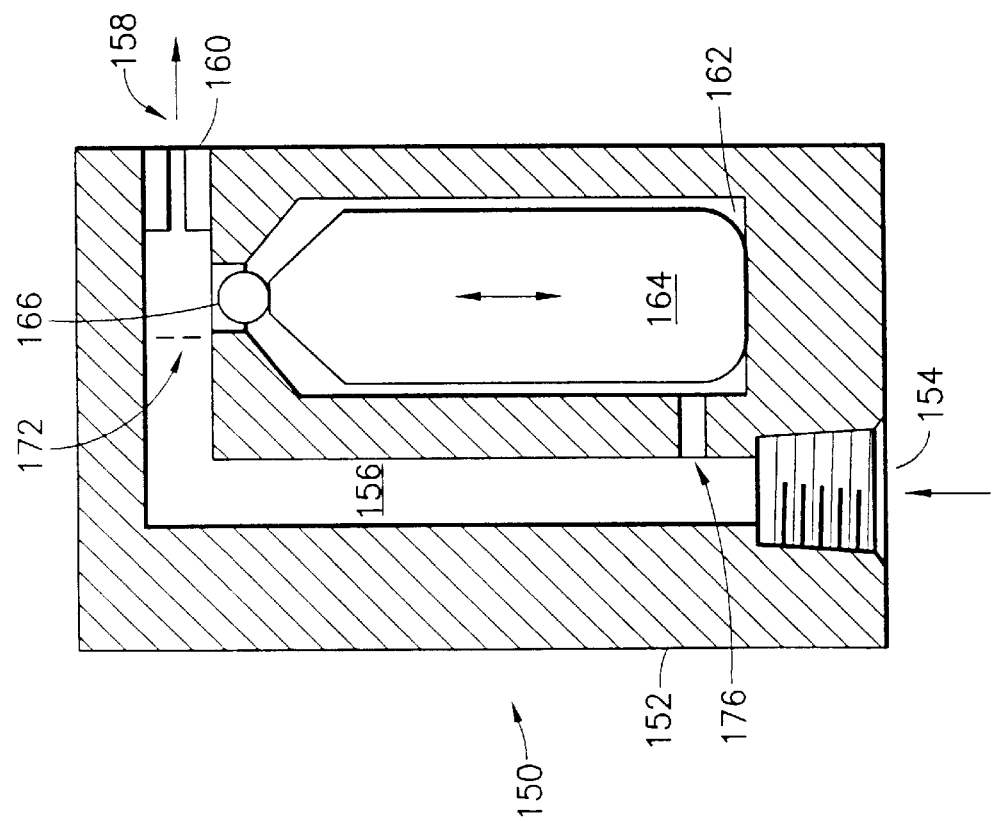
FIG. 9 is a cross-sectional view of an alternative vent valve configuration.

An alternate to the vent valve 90 described above is shown in FIG. 9 and designated generally therein by the reference character 150. As shown the vent valve 150 include a valve body 152 having an inlet 154 that is designed to be coupled to the uppermost portion of the oxidizer tank 12. The valve body 152 includes a flow passage 156 that leads from the inlet 154 to an outlet 158. A valve seat 160 is positioned at the outlet 158. The valve body 152 also includes a float chamber 162 that includes a float 164. The upper end of the float 164 and the float chamber 162 have complementary converging surfaces. The converging surfaces of the upper portion of the float chamber 162 converge toward and to a ball port 166. The converging surfaces of the upper portion of the float 164 converge toward a ball support pad 168. A valving element in the form of a ball 170 rests atop the ball support pad 168 of the float 164. A cage or equivalent 172 extends across the flow passage 156 to the left of the ball port 166. A bypass passageway 176 leads from the flow passage 156 to the float chamber 162.

In normal operation, the oxidizer tank 12 is filled with oxidizer 14 as described above through the fill tube 38. As the oxidizer tank 12 fills, gases in the headspace above the rising level of the oxidizer 14 pass into the inlet 154, the flow passage 156, out through the outlet 158. As the oxidizer tank 12 is filled and the level of the oxidizer 14 rises into the flow passage 156, the liquid oxidizer 14 will enter the float chamber 162 through the bypass passageway 176. The float 164 will rise pushing the ball 170 into the flow passage 156. The drag forces on the ball 170, as a consequence of the flow through the flow passage 156, will force the ball 170 against the valve seat 160 to halt the oxidizer flow.

A second alternate to the vent valve 90 described above is shown in FIG. 10 and designated generally therein by the reference character 180. As shown the vent valve 180 includes a valve body 182 having an inlet 184 that is designed to be coupled to the uppermost portion of the oxidizer tank 12. The valve body 182 includes a flow passage 186 that leads from the inlet 184 to an outlet disc 188 that includes a plurality of outlet passages 190. A downwardly converging valve seat 192 is positioned on the underside of the outlet disc 188. A valve member 194 is slidably mounted in the flow passage 186 and includes through opening 196 and a valve surface 198 that is designed to interface with the valve seat 192. An O-ring (unnumbered) is located in a groove on the periphery of the valve member 194 and provides a sliding seal with the walls of the valve body 182. A helical coil spring (unnumbered), in compression, resiliently urges the valve member 194 downwardly in FIG. 10.

Figure 10:
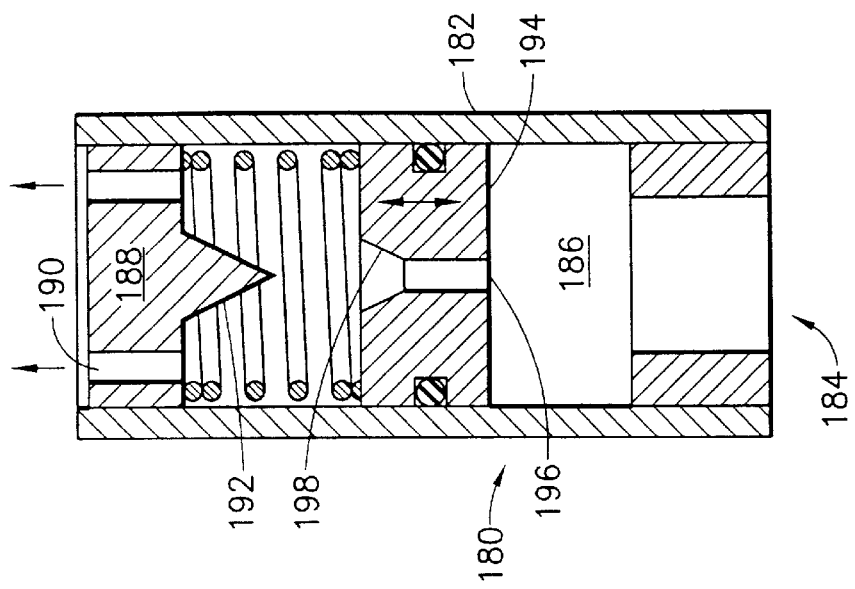
FIG. 10 is a cross-sectional view of a second alternative vent valve configuration.

In normal operation using the vent valve 180 of FIG. 10, the oxidizer tank 12 is filled with oxidizer 14 as described above through the fill tube 38. As the oxidizer tank 12 fills, gases in the headspace above the rising level of the oxidizer 14 pass into the inlet 184, the flow passage 186, and out through the outlet passages 190 of the outlet disc 188. As the oxidizer tank 12 is filled and the level of the oxidizer 14 rises into the flow passage 186, the valve member 194 will rise pushing the valve member 194 against the valve seat 192 to halt the flow.

If oxidizer tank 12 is not vented, it is necessary to design a small amount of dead space into the oxidizer tank to account for the vapor pressure of the gas trapped at the top of the tank 12. The presence of this vapor at the top of the tank may prevent the oxidizer tank 12 from being filled more than sixty or seventy percent with liquid oxidizer unless a liquid oxidizer pump is employed. If the vent valve 90, or its functional equivalent is used, the oxidizer tank 12 can be almost completely filled with liquid oxidizer. The vent valve may also be of the type that is manually or remotely or automatically actuated when the tank is filled with liquid oxidizer.

The interior of the oxidizer tank 12 may be equipped with a pressure sensor which is activated when the oxidant pressure drops below a predetermined level after initial pressurization. The sensor's actuation may initiate a timer preset to the rocket's predicted time of coast to apogee so that when the timer times out the rocket's recovery system is activated. Alternatively, the pressure sensor actuation may be used to ignite one or more additional rocket stages or to activate payload electronics. In a more elaborate system using an analog pressure sensor, the system may trigger a wide variety of in-flight events based on particular absolute pressure readings, rates of change, or the like.

Figure 11:
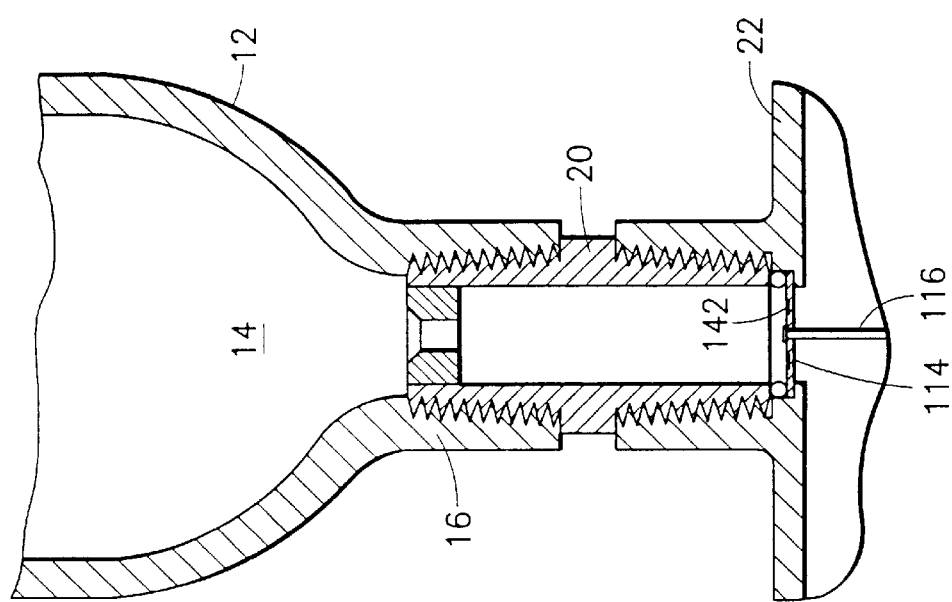
FIG. 11 is a cross-sectional view of a rupturable diaphragm interface between the oxidizer tank and the rocket motor assembly.

As shown in FIG. 11, a diaphragm may be used as an alternative to the above oxidizer manifold/valve structures. As shown, a diaphragm 114 having an annular indentation 142 may span the reduced-diameter neck 16 of the oxidizer tank 12. The diaphragm 114 has enough strength to withstand the pressure of the oxidizer 14; however when electrical energy is applied to a wire 116 connected to an external source (not shown), the diaphragm 114 heats and ruptures along the indentation 142, thereby releasing the oxidizer 14 into the combustion chamber. The wire 116 may be in contact with chemical agents which will combust vigorously when heated in this process to thereby ignite the motor at the time the oxidizer is released.

As a variation of this feature, the wire 116 may be connected to an electrical source for a period of time prior to ignition to provide gradual heating of the fuel grain 24 to facilitate ignition; then, the wire 116 can be connected to a discharge capacitor or similar device to deliver a brief high energy pulse to the diaphragm 114, causing diaphragm rupture as described above.

An alternative to the ignition system using ignition-assist tube 54 and start oxidizer described above, a pyrotechnic ignition system may be used. This system utilizes a pyrotechnic igniter to produce combustion chamber pressure and ignition temperature. The pyrotechnic igniter may be a ring of material at the top of the fuel grain 24. It also may take the form of a thin liner on the interior surface of the fuel grain 24 proximate to the ignition-assist tube 54. Such a pyrotechnic igniter would consist of a chemical mixture containing fuel and oxidizer, such as HTPB and ammonium perchlorate, ignitable by means of electric current.

The use of a pyrotechnic igniter may be avoided altogether by partially filling the combustion chamber with an oxidizer such as gaseous oxygen (GOX) at 50–125 psi using the ignition-assist tube 54 as described above, and igniting the fuel grain 24 with a bipolar spark igniter.—When the fuel grain 24 and combustion chamber GOX are fully burning, the oxidizer 14 in the oxidizer tank 12 is released into the combustion chamber using one of the methods described above to make the rocket motor assembly 200 fully operational. This technique works particularly well with reactant combinations that are rather difficult to ignite, such as nitrous oxide ($N_2O$) and polyethylene.

Figure 12:
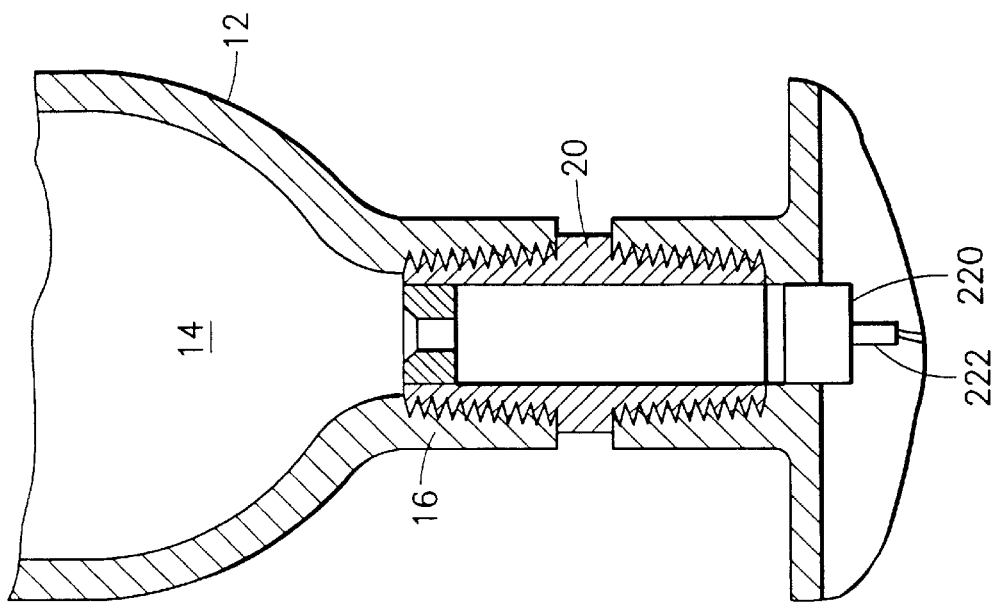
FIG. 12 is a cross-sectional view of an igniter plug interface between the oxidizer tank and the rocket motor assembly.

The use of a pyrotechnic igniter may be avoided by using an igniter plug molded from an elastomeric solid propellant material such as HTPB with a cross-linker and plasticizer and a solid oxidizer such as ammonium perchlorate. As shown in FIG. 12, the igniter plug 220 is molded to block the flow of oxidizer from the oxidizer tank into the combustion chamber of the rocket motor assembly 200. If the igniter plug 220 is ignited with an electric squib 222 or similar device, it will burn through from the center outward, thereby permitting the flow of oxidizer to begin while it continues to burn in place. The plug-igniter could also be molded with a squib in place. As a variation on the above design, a spring-loaded, normally-open mechanical valve may be placed between the oxidizer tank 12 the combustion chamber. The valve is maintained in a closed position by a molded insert made from solid propellant material. When the insert is ignited by, for example, an electric squib, the insert burns and releases the valve permitting the valve to open and deliver oxidizer from the oxidizer tank 12 into the combustion chamber.

Figure 13:
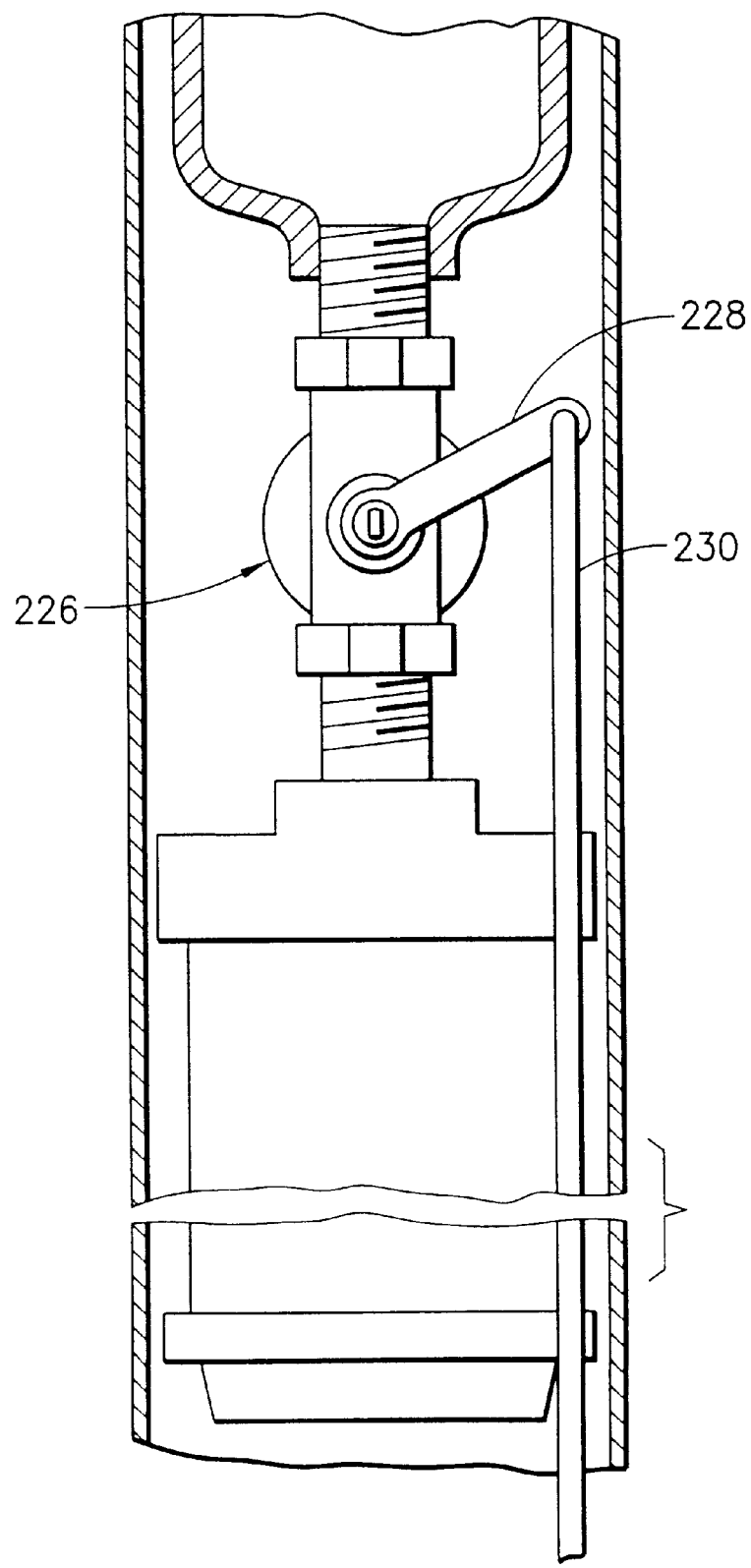
FIG. 13 is a cross-sectional view of a valved flow path between the oxidizer tank and the rocket motor assembly.

Delivery of oxidizer can also be controlled through a valving arrangement interposed between the oxidizer tank 12 and the rocket motor assembly 100. As shown in FIG. 13, a valve 226 is interposed between the oxidizer tank 12 and the rocket motor assembly 100 and includes a rotatable handle 228 connected to a control strut 230. The control strut 230 can be coupled to the launch platform 40 so that the oxidant flow is started at lift-off. Alternatively, the control strut 230 can be connected to an actuator that control oxidizer flow in flight to control trust.

If an insert-molded thrust nozzle 32 is used, it is preferably fabricated as follows: First, the thrust nozzle 32 is placed over a core which has on its exterior all of the features of the motor interior (e.g., a two-piece core which slides together axially from both sides of the thrust nozzle 32). The core is then inserted into the mold cavity (having the features of the exterior of the fuel grain) and the fuel grain material is injected into the cavity and around the core and thrust nozzle 32. The geometry and materials are chosen such that the thrust nozzle 32 is bonded and/or locked into the fuel grain 24. After the material has solidified, the cores are removed to leave the thrust nozzle 32 molded into the fuel grain 24.

In a variation of the solid fuel grain 24, the fuel grain 24 is prepared with a combination of an oxidizer such as ammonium perchlorate, and a binder/fuel such as HTPB with a cross-linker such as a polyisocyanate. Preferably, this fuel also contains a combustion additive such as aluminum (powdered), magnesium (powdered), or another suitable compound. The ratio of materials in the oxidized fuel grain are such that there is an excess of fuel relative to oxidizer on the order of ten percent or so.

Hereafter, this fuel-rich oxidized fuel grain will be referred to as oxidized fuel grain. The oxidized fuel grain is ignited and oxidizer such as nitrous oxide ($N_2O$) or liquid oxygen (LOX) is forced into the combustion chamber where it combines with the excess fuel in the oxidized fuel grain. The liquid and/or gaseous oxidizer balances the combustion by combining with the excess fuel in the oxidized fuel grain. In this embodiment, the design percentages are determined by the nature of solid propellant mixtures; extra fuel/binder is required in the oxidized fuel grain to ensure structural integrity.

The fuel grain 24 need not be of a single, unitary design. It can have a composite structure wherein multiple grain elements are disposed in a cylindrical and coaxial arrangement or other arrangement such that different grain materials are exposed during combustion, resulting in changing combustion characteristics. The varying of thrust, flame visibility or color, smoke visibility or color, and other characteristics can be achieved in this embodiment.

Further, the fuel grain 24 may adopt a design similar to the ones shown in FIGS. 7 and 8 where the element 72 is not an igniter but instead is composed of the oxidized fuel grain described above. The oxidized fuel grain 72 is disposed within a larger non-oxidized fuel grain 24 of a shell of combustible fuel such as HTPB, a thermoplastic or other combustible material. Initially, the oxidized fuel grain 72 is ignited, the flow of oxidizer starts, and the non-oxidized fuel grain 24 begins to burn.

The combination of the oxidized fuel grain 72 and non-oxidized fuel grain 24 as described above can be tailored to produce a relatively high initial thrust at takeoff followed by a lower sustain thrust.

In another embodiment, the fuel grain comprises a solid oxidizer such as ammonium perchlorate with a binder such as HTPB with or without other materials. In a low oxidizer fuel grain, the ratio of oxidizer to fuel is such that the resulting material is not sufficiently combustible to earn the material an explosives classification, nor is it highly restricted by government agencies for manufacture, sale, purchase, storage transportation, use, etc. This low oxidizer fuel grain is loaded into a combustion chamber and either self-ignited or ignited with a booster material. A liquid or gaseous oxidizer is injected into the combustion chamber to balance the combustion of excess fuel in the low oxidizer fuel grain.

This low oxidizer fuel grain system has the advantage of offering a safe, easily transported and stored, low flammability rocket fuel material. It offers another advantage over traditional hybrid rocket designs which use a fuel grain containing no oxidizer. The low oxidizer fuel grain system is easier to ignite, shut down and re-ignite; if oxidizer flow is suspended during operation, the low oxidizer fuel grain will continue to combust slowly. When oxidizer flow is restored, the combustion rate increases and thrust is resumed.

Other materials besides HTPB are useful as a fuel grain as is known to those skilled in the art. Illustrative of these other materials are polyolefins, polyacrylates, non-polymerized hydrocarbons and rubbers. Polyolefins include, for instance, polyethylene, polypropylene, copolymers of polyethylene, copolymers of polypropylene, mixtures thereof. Polyacrylates include, for instance, polymethyl (meth)acrylate. Non-polymerized hydrocarbons include, for instance, paraffin and solidified kerosene. Rubbers include, in addition to HTPB, styrene-butadiene rubber (SBR) and the like.

Figure 14:
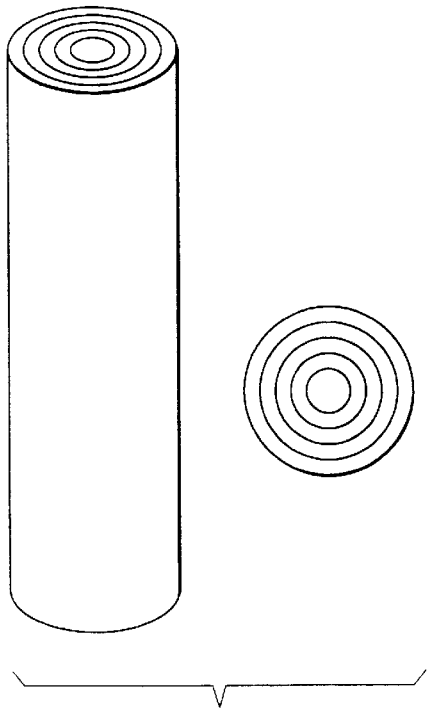
FIG. 14 is a perspective view of a fuel grain configured as multiple concentric layers of fuel of differing characteristics.
Figure 15:
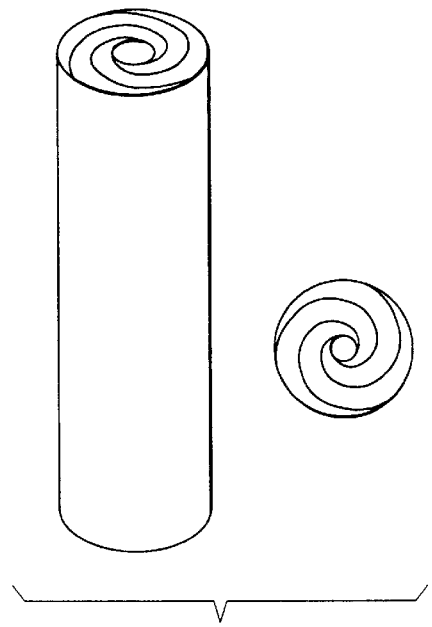
FIG. 15 is a perspective view of a fuel grain configured as multiple layers of fuel of differing characteristics spirally wound.
Figure 16:
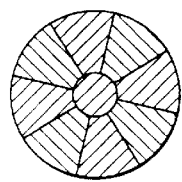
FIG. 16 is a perspective view of a fuel grain configured as multiple sectors of differing fuel characteristics.
Figure 17:
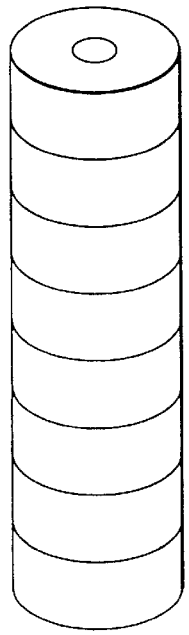
FIG. 17 is a perspective view of a fuel grain configured as stacked annular layers of fuel of differing characteristics.

The fuel grain may be configured in different forms depending upon the application and as shown in FIGS. 14–17. In FIG. 14, the fuel grain 24 is configured as multiple concentric layers of fuel of differing characteristics. In FIG. 15 the fuel grain 24 is configured as multiple spirally wound layers of fuel, each layer having a differing characteristics. In FIG. 16, the fuel grain 24 is configured as multiple sectors of differing fuel characteristics, and, in FIG. 17, the fuel grain is configured as stacked annular layers of fuel of differing characteristics.

It should be noted that the rocket motor assembly 200 may be an integral part of the entire rocket assembly. For example, the outer casing 18 may also form the exterior shell of the rocket body. Alternatively, the rocket motor assembly 200 may be a cartridge-like insert into a reusable body. This version of the rocket motor assembly 200 is particularly well suited to hobbyist applications and the like.

Figure 18:
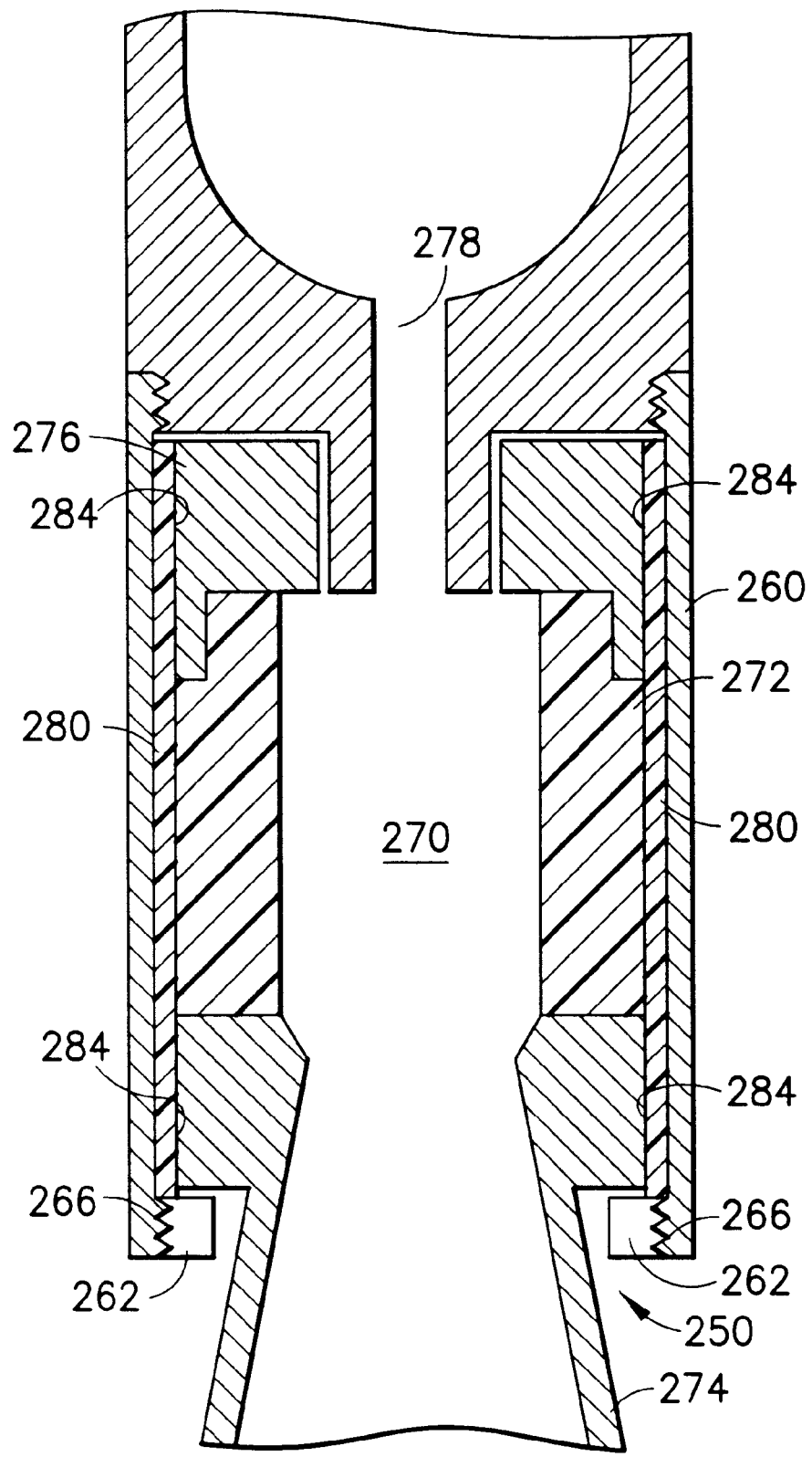
FIG. 18 is a cross-sectional view of a tenth embodiment of a rocket motor according to the present invention, in which the rocket motor includes a removable and disposable cartridge that is receivable in a reusable body.

FIG. 18 illustrates an embodiment of the present invention in which a disposable cartridge, generally designated by reference numeral 250, suitable for use in a reusable outer casing is provided.

FIG. 18 illustrates the cartridge 250 in its operative position in which at least a substantial portion of the cartridge 250 is received within the outer casing 260 in an operative position. The cartridge 250 is retained within the outer casing 260 by an aft-end retainer 262, which has a screw-threaded surface (unnumbered) engageable with a corresponding screw-threaded surface 266 located at an aft end portion of the outer casing 260. When the aft-end retainer 262 is disengaged and removed from the aft end portion of the outer casing 260, the cartridge 250 can be inserted into or removed from the outer casing 260 by, for example, sliding the cartridge 250 relative to the outer casing 260.

Figure 18A:
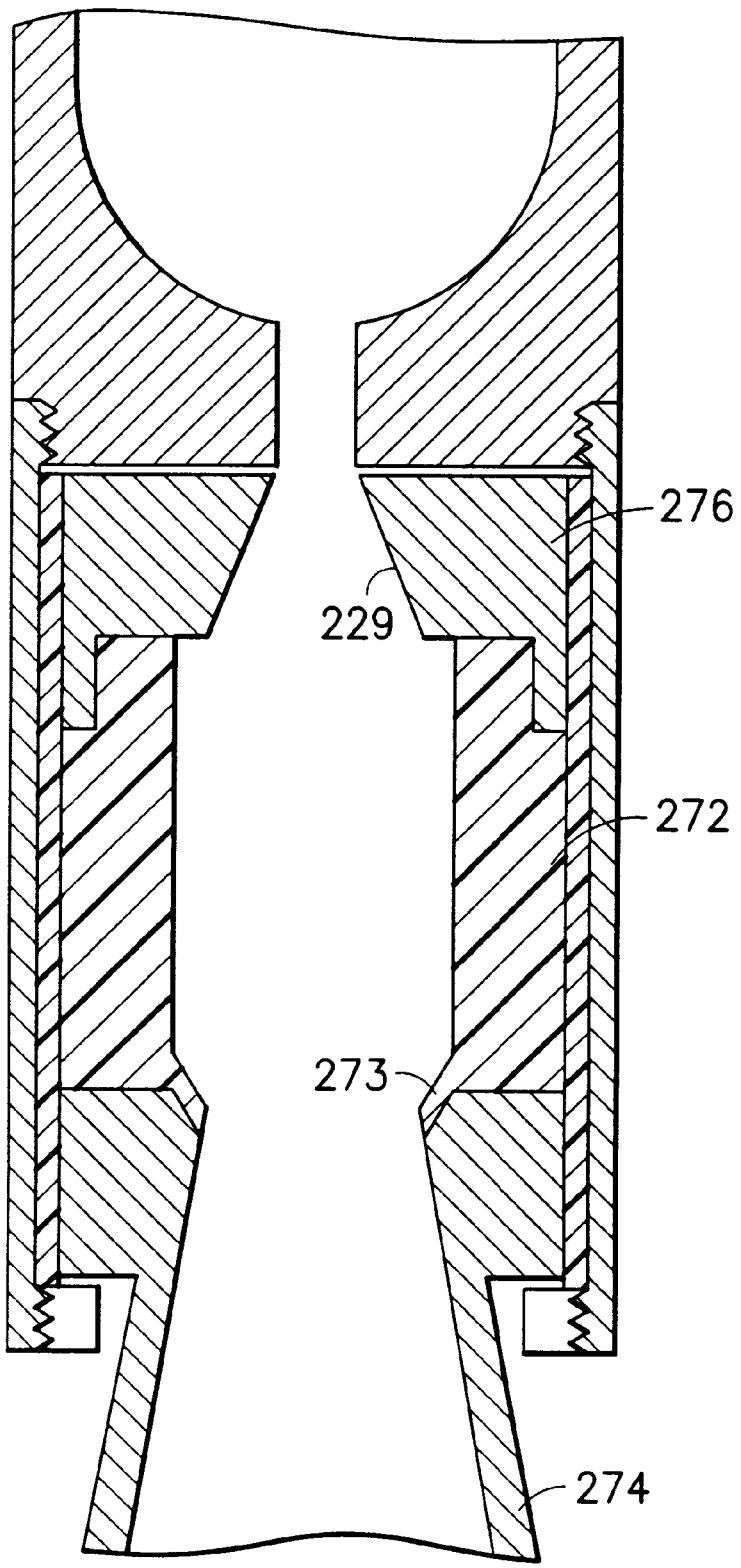
FIG. 18A is a cross-sectional view of the tenth embodiment of a rocket motor illustrating an optional nozzle in the distribution plate, and shield formed of solid reactant which covers the gas entry inlet on the nozzle.

The cartridge 250 comprises a combustion chamber 270 containing a solid reactant. 272 therein, a thrust nozzle 274 proximal to the aft end of the combustion chamber 270, an oxidizer distribution plate 276 proximal to the opposite end of the combustion chamber 270, and a protective liner 280 extending along at least the length of the combustion chamber 270. Referring to FIG. 18A, the distribution plate 276 is alternatively provided with an axial flared injection nozzle 229 therethrough. When the cartridge 250 is in its operative position, the protective liner 280 is interposed between the exterior surface of the solid reactant 272 and the interior surface of the outer casing 260.

The oxidizer distribution plate 276 and/or the thrust nozzle 274 can be hermetically sealed to the protective liner 280. These hermetic seals, generally designated by reference numeral 284, can be formed from at least one member selected from an epoxy resin and the solid reactant 272. The protective liner 280 can be fabricated from flame-retardant cardboard and/or phenolic-bonded paper.

The thrust nozzle 274 can be formed from the materials and can exhibit configurations described above in the preceding embodiments. For example, the thrust nozzle 274 can be fabricated from a material selected from the group consisting of graphite, phenolic, ceramic. The thrust nozzle 274 can also comprise a conically converging gas entry inlet, a reduced-diameter throat, and a conically diverging gas outlet. According to the alternate embodiment shown in FIG. 18A, the solid reactant 272 of the combustion chamber 270 can be configured to define a converging entry port shield 273 that covers the gas entry inlet of the thrust nozzle 274.

In operation, the cartridge 250 is introduced into the outer casing 260, for example by sliding the cartridge 250 relative to the outer casing 260, and thereafter secured in the outer casing 260 with the aft-end retainer 262 and/or one or more similar retaining devices. The propulsion system is then activated, during which at least a portion of the fuel component 272 is reacted with the oxidizer component and expelled from the thrust nozzle 274 to propel the system. After use, the aft-end retaining device 262 can be disengaged and the spent cartridge removed from the outer casing 260. A new cartridge can then be introduced into the outer casing 260. In this manner, the outer casing 260 and other components of the propulsion system can be recycled for use multiple times, thereby providing evident fiscal benefits.

The embodiment illustrated in FIG. 18 can be practiced in combination with one or more of the features of any of the preceding embodiments.

The complete disclosures of any United States or foreign patents or patent applications mentioned or cited hereinabove are hereby incorporated by reference into the present specification.

As will be apparent to those skilled in the art, various changes and modifications may be made to the illustrated hybrid rocket system and motor for use therein of the present invention without departing from the spirit and scope of the invention as determined in the appended claims and their legal equivalent.

What is claimed is:

1. A solid/fluid hybrid propulsion system for a projectile launchable from a launch platform, comprising:
   a container having a fluid reactant therein;
   an outer casing;
   a cartridge constructed and arranged to be moved between an operative position in which at least a substantial portion of said cartridge is received within said outer casing and an inoperative position in which said cartridge is dissociated from said outer casing, said cartridge comprising a combustion chamber containing a solid reactant therein, a thrust nozzle proximal to one end of said combustion chamber, an oxidizer distribution plate proximal to the opposite end of said combustion chamber and having an injection nozzle therethrough, and a protective liner extending along at least the length of said combustion chamber and being interposed between the exterior surface of the solid reactant and the interior surface of said outer casing when said cartridge is in the operative position; and
   a fluid-flow pathway connecting said fluid reactant container and said combustion chamber.

2. The propulsion system of claim 1, wherein said oxidizer distribution plate is hermetically sealed to said protective liner.

3. The propulsion system of claim 1, wherein said thrust nozzle is hermetically sealed to said protective liner.

4. The propulsion system of claim 2, wherein said thrust nozzle is hermetically sealed to said protective liner.

5. The propulsion system of claim 4, wherein the hermetic seals are formed from at least one member selected from an epoxy resin and the solid reactant.

6. The propulsion system of claim 4, wherein said thrust nozzle is fabricated from a material selected from the group consisting of graphite, phenolic, ceramic.

7. The propulsion system of claim 4, wherein said thrust nozzle includes a conically converging gas entry inlet, a reduced-diameter throat, and a conically diverging gas outlet.

8. The propulsion system of claim 7, wherein said solid reactant is configured to define a converging entry port shield that covers said gas entry inlet of said thrust nozzle.

9. The propulsion system of claim 1, wherein said protective liner is fabricated from flame-retardant cardboard or phenolic-bonded paper.

10. The propulsion system of claim 1, wherein said solid reactant is formed about a longitudinal axis as a hollow fuel cylinder.

11. The propulsion system of claim 1, wherein the solid reactant is formed about a longitudinal axis as a hollow fuel cylinder of a combination of a fuel and an oxidizer and having an oxidizer-rich inner region.

12. The propulsion system of claim 11, further comprising a igniter in the form of a thin liner on the interior surface of said hollow fuel cylinder.

13. The propulsion system of claim 11, further comprising:

a pyrotechnic igniter which comprises a chemical mixture containing fuel and oxidizer.

14. The propulsion system of claim 13, wherein said chemical mixture of said pyrotechnic igniter includes HTPB and ammonium perchlorate.

15. The propulsion system of claim 1, wherein an aft end portion of said outer casing has screw threaded surface, and wherein said propulsion system further comprises an aft-end retainer engageable with said screw threaded surface of said outer casing to retain said cartridge in the operative position.

16. The propulsion system of claim 1, wherein said cartridge is slidable between the operative position and the inoperative position.

17. The propulsion system of claim 1, further comprising a flow-control member operatively associated with said flow pathway and movable between a first position in which said flow-control member obstructs flow through said flow pathway and a second position in which said flow-control member admits fluid reactant from said container into said combustion chamber for reaction with said solid reactant to produce thrust for propelling the projectile.

* * * * *